United States Patent
Park et al.

(10) Patent No.: US 10,326,988 B2
(45) Date of Patent: *Jun. 18, 2019

(54) METHOD AND APPARATUS FOR ENCODING/DECODING IMAGE INFORMATION

(71) Applicant: LG Electronics Inc., Seoul (KR)

(72) Inventors: Seungwook Park, Seoul (KR);
Jaehyun Lim, Seoul (KR); Yongjoon Jeon, Seoul (KR); Chulkeun Kim, Seoul (KR); Jungsun Kim, Seoul (KR); Naeri Park, Seoul (KR); Hendry Hendry, Seoul (KR); Byeongmoon Jeon, Seoul (KR); Joonyoung Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/356,314

(22) PCT Filed: Nov. 5, 2012

(86) PCT No.: PCT/KR2012/009248
§ 371 (c)(1),
(2) Date: May 5, 2014

(87) PCT Pub. No.: WO2013/066133
PCT Pub. Date: May 10, 2013

(65) Prior Publication Data
US 2014/0369428 A1 Dec. 18, 2014

Related U.S. Application Data

(60) Provisional application No. 61/555,495, filed on Nov. 4, 2011, provisional application No. 61/558,398, filed
(Continued)

(51) Int. Cl.
*H04N 19/86* (2014.01)
*H04N 19/117* (2014.01)
(Continued)

(52) U.S. Cl.
CPC ......... *H04N 19/117* (2014.11); *H04N 19/136* (2014.11); *H04N 19/159* (2014.11);
(Continued)

(58) Field of Classification Search
CPC ........................... H04N 7/26888; H04N 7/50; H04N 7/26244; H04N 7/30; G06T 5/001
(Continued)

(56) References Cited

U.S. PATENT DOCUMENTS 6,931,063 B2 8/2005 Sun
7,352,812 B2 4/2008 Sun
(Continued)

FOREIGN PATENT DOCUMENTS

CN 1812580 8/2006
CN 101449476 6/2009
(Continued)

OTHER PUBLICATIONS

International Search Report dated Feb. 25, 2013 for Application No. PCT/KR2012/009248, with English Translation, 10 pages.
(Continued)

*Primary Examiner* — Shawn S An
(74) *Attorney, Agent, or Firm* — Fish & Richardson P.C.

(57) ABSTRACT

A deblocking filtering method, a boundary strength (bS) deriving method, and encoding/decoding method and apparatus using the methods are provided. The bS deriving method includes the steps of: deriving a boundary of a deblocking filtering unit block which is a unit block on which deblocking filtering is performed; and setting a bS for each bS setting unit block in the deblocking filtering unit
(Continued)

block. Here, the step of setting the bS includes setting a bS value of a target boundary corresponding to the boundary of the deblocking filtering unit block as the bS setting unit block.

17 Claims, 24 Drawing Sheets

Related U.S. Application Data on Nov. 10, 2011, provisional application No. 61/569,291, filed on Dec. 12, 2011.

(51) Int. Cl.
  *H04N 19/159* (2014.01)
  *H04N 19/176* (2014.01)
  *H04N 19/136* (2014.01)
  *H04N 19/82* (2014.01)

(52) U.S. Cl.
  CPC .......... *H04N 19/176* (2014.11); *H04N 19/82* (2014.11); *H04N 19/86* (2014.11)

(58) Field of Classification Search
  USPC ............ 375/240.29, 240.26, 240.16, 240.13, 375/240.18, 240.12; 382/268, 260, 236, 382/248, 238
  See application file for complete search history.

(56) References Cited

U.S. PATENT DOCUMENTS

| | | | |
|---|---|---|---|
| 7,440,501 B2 | 10/2008 | Sun | |
| 7,450,641 B2 | 11/2008 | Sun | |
| 7,613,240 B2 | 11/2009 | Sun | |
| 7,787,542 B2 | 8/2010 | Sun | |
| 7,907,667 B2 | 3/2011 | Sun | |
| 7,929,610 B2 | 4/2011 | Sun | |
| 7,961,963 B2 | 6/2011 | Sun | |
| 8,040,957 B2 | 10/2011 | Sun | |
| 8,175,168 B2 | 5/2012 | Sun | |
| 8,204,129 B2 | 6/2012 | He | |
| 8,218,619 B2 | 7/2012 | Park | |
| 8,805,100 B2* | 8/2014 | Ikai | G06T 9/00 375/240.16 |
| 8,971,419 B2* | 3/2015 | Park | H04N 19/136 375/240.12 |
| 9,167,269 B2* | 10/2015 | Van der Auwera | H04N 19/117 |
| 2002/0136303 A1 | 9/2002 | Sun | |
| 2002/0146072 A1 | 10/2002 | Sun | |
| 2003/0053541 A1 | 3/2003 | Sun | |
| 2004/0190626 A1 | 9/2004 | Sun | |
| 2005/0117653 A1* | 6/2005 | Sankaran | H04N 19/159 375/240.24 |
| 2005/0175103 A1 | 8/2005 | Sun | |
| 2006/0126962 A1* | 6/2006 | Sun | H04N 19/139 382/268 |
| 2006/0146941 A1* | 7/2006 | Cha | H04N 19/61 375/240.29 |
| 2006/0147123 A1* | 7/2006 | Kajihata | H04N 19/176 382/239 |
| 2006/0171472 A1 | 8/2006 | Sun | |
| 2006/0209959 A1 | 9/2006 | Sun | |
| 2006/0210185 A1 | 9/2006 | Sun | |
| 2006/0268988 A1 | 11/2006 | Sun | |
| 2007/0031065 A1 | 2/2007 | Sun | |
| 2007/0098076 A1 | 5/2007 | Sun | |
| 2007/0098077 A1 | 5/2007 | Sun | |
| 2007/0098278 A1 | 5/2007 | Sun | |
| 2008/0240252 A1 | 10/2008 | He | |
| 2009/0022415 A1* | 1/2009 | Zarubinsky | H04N 19/117 382/260 |
| 2009/0116546 A1 | 5/2009 | Park | |
| 2010/0260264 A1 | 10/2010 | Sun | |
| 2011/0116549 A1* | 5/2011 | Sun | H04N 19/139 375/240.16 |
| 2011/0188581 A1* | 8/2011 | Choi | H04N 19/00 375/240.24 |
| 2011/0222607 A1* | 9/2011 | An | H04N 19/159 375/240.24 |

FOREIGN PATENT DOCUMENTS

| | | |
|---|---|---|
| CN | 103947203 | 7/2014 |
| EP | 2750385 A1 | 7/2014 |
| JP | 2011517230 | 5/2011 |
| KR | 10-2005-0048871 A | 5/2005 |
| KR | 1020060080107 | 7/2006 |
| KR | 10-2008-0005210 A | 1/2008 |
| KR | 10-2009-0045035 A | 5/2009 |
| KR | 10-2010-0014581 A | 2/2010 |
| KR | 10-2011-0114498 A | 10/2011 |
| WO | WO 2003/026313 A1 | 3/2003 |
| WO | WO 2006/101681 A2 | 9/2006 |
| WO | WO 2006/101682 A2 | 9/2006 |
| WO | WO 2007/064347 A2 | 6/2007 |
| WO | WO 2008/118562 A1 | 10/2008 |
| WO | WO2009126299 | 10/2009 |
| WO | WO 2011/129619 A2 | 10/2011 |
| WO | WO 2011/129620 A2 | 10/2011 |
| WO | WO 2011/129621 A2 | 10/2011 |

OTHER PUBLICATIONS

Park et al., "Non-CE12: Simplified BS Calculation Process in Deblocking Filter", Joint Collaborative Team on Video Coding (JCT-VC) of ITU-T SG16 WP3 and ISO/IEC JTC1/SC29/WG11, 7th Meeting: Geneva, CH, Nov. 21-30, 2011, 12 pages.

Chen et al., "An Effective Method of Deblocking Filter for H.264/AVC", Communications and Information Technologies, Oct. 1, 2007, 4 pages.

Sun et al., "Improved TML Loop Filter with Lower Complexity", ITU-Telecommunications Standardization Sector, Study Group 16, Question 6, Video Coding Experts Group (VCEG), Fourteenth Meeting: Santa Barbara, CA, USA Sep. 24-28, 2001, 8 pages.

European Search Report dated May 7, 2015 for corresponding European Patent Application No. 12846692.7, 9 pages.

Unknown, "Advanced video coding for generic audiovisual services," ITU-Telecommunications Standardization Sector of ITU, Series H, H.264, Jun. 2011, 14 pages.

Ugur et al., "Description of video coding technology proposal by Tandberg, Nokia, Ericsson," Joint Collaborative Team on Video Coding (JCT-VC) of ITU-T SG16 WP3 and ISO/IEC JTC1/SC29/WG11, 1st Meeting: Dresden, DE, Apr. 15-23, 2010, 2 pages.

Ikeda et al., "Parallel deblocking filter," Joint Collaborative Team on Video Coding (JCT-VC) of ITU-T SG16 WP3 and ISO/IEc JTC1/SC29/WG11, 4th Meeting: CH, Jan. 2011, 7 pages.

Norkin et al., "CE12: Ericsson's and MediaTek's deblocking filter," Joint Collaborative Team on Video Coding (JCT-VC) of ITU-T SG16 WP3 and ISO/IEC JTC1/SC29/WG11, 6th Meeting: Torino, IT, Jul. 14-22, 2011, 6 pages.

Bross et al.: "WD4: Working Draft 4 of High-Efficiency Video Coding", Joint Collaborative Team on Video Coding (JCT-VC) 6th Meeting: Torino, vol. JCTVC-F803_d5, JPN6018019138, Oct. 28, 2011, 319 pages.

Park et al.: "BS decision tree simplification", Joint Collaborative Team on Video Coding (JCT-VC) 7th Meeting: Geneva, vol. JCTVC-G175-v1, JPN6018019139, Nov. 8, 2011, 4 pages.

Park et al.: "Simplified BS calculation process in deblocking filter", Joint Collaborative Team on Video Coding (JCT-VC) 7th Meeting: Geneva, vol. JCTVC-G176-v1, JPN6018019140, Nov. 2011, 4 pages.

(56) References Cited

OTHER PUBLICATIONS

Norkin: "BoG report on resolving deblocking filter description issues", Joint Collaborative Team on Video Coding (JCT-VC), vol. JCTVC-G1035, JPN6018019142, Nov. 28, 2011, 22 pages.

\* cited by examiner

FIG. 7
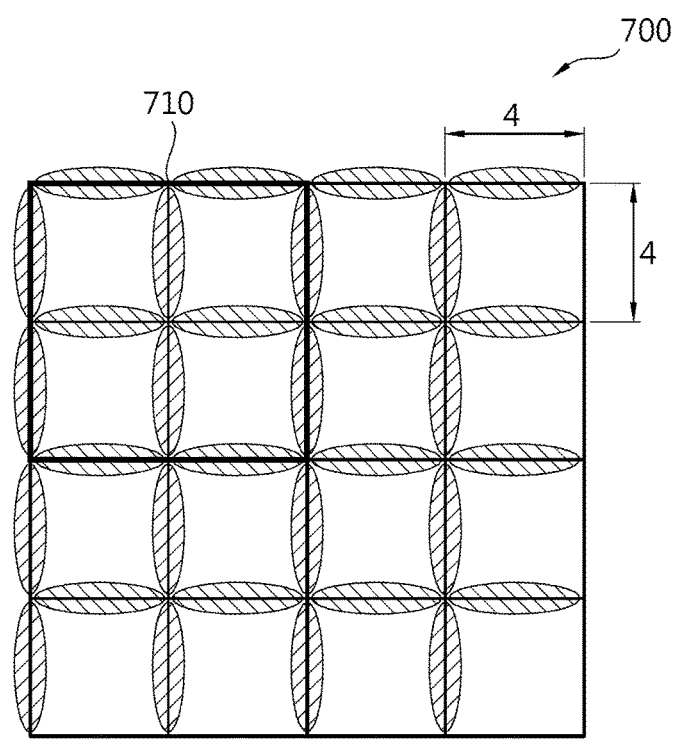
 bS DECISION FOR VERTICAL EDGE
 bS DECISION FOR HORIZONTAL EDGE

METHOD AND APPARATUS FOR ENCODING/DECODING IMAGE INFORMATION

CROSS REFERENCE TO RELATED APPLICATIONS

This application is a U.S. National Phase Application under 35 U.S.C. § 371 of International Application PCT/KR2012/009248, filed on Nov. 5, 2012, which claims the benefit of U.S. Provisional Application No. 61/555,495, filed on Nov. 4, 2011, U.S. Provisional Application No. 61/558,398, filed on Nov. 10, 2011, and U.S. Provisional Application No. 61/569,291, filed on Dec. 12, 2011, the entire content of the prior applications is hereby incorporated by reference.

TECHNICAL FIELD

The present invention relates to a video information compression technique, and more particularly, to a method of applying a deblocking filter as an in-loop filter.

BACKGROUND ART

Recently, demands for a high-resolution and high-quality image have increased in various fields of applications. As an image has higher resolution and higher quality, an amount of data on the image increases more.

Accordingly, when video data is transferred using media such as existing wired or wireless broadband lines or video data is stored in existing storage media, the information transfer cost and the information storage cost increase.

High-efficiency video compressing techniques can be used to effectively transfer, store, and reproduce information on high-resolution and high-quality images.

Inter prediction and intra prediction can be used to enhance video compression efficiency. In the inter prediction, pixel values of a current picture are predicted with reference to information of other pictures. In the intra prediction, pixel values of a current picture are predicted using an inter-pixel relationship in the same picture.

Various methods for making an image equal to an original image can be applied to a process unit, for example, a block, of a predicted picture. Accordingly, a decoder can decode a video more accurately (more closely to an original image), and an encoder can encode a video to reconstruct the image more accurately.

SUMMARY OF THE INVENTION

Technical Problem

An object of the present invention is to provide a method and an apparatus which can reconstruct an image to be close to an original image by effectively removing deblocking artifacts in application of deblocking filtering.

Another object of the present invention is to provide a method and an apparatus which can enhance compression efficiency by reducing complexity in application of deblocking filtering.

Still another object of the present invention is to provide a method and an apparatus which can reduce complexity by effectively setting a unit block for determining a bS (boundary strength) value in application of deblocking filtering.

Still another object of the present invention is to provide a method and an apparatus which can reduce complexity by effectively setting a bS value in application of deblocking filtering.

Solution to Problem

According to an aspect of the invention, there is provided a boundary strength (bS) deriving method including the steps of deriving a boundary of a deblocking filtering unit block which is a unit block on which deblocking filtering is performed; and setting a bS of each bS setting unit block in the deblocking filtering unit block, wherein the step of setting the bS includes setting a bS value of a target boundary corresponding to the boundary of the deblocking filtering unit block as a boundary of the bS setting unit block.

The step of setting the bS may include: setting the bS value of the target boundary to bS2 when at least one of two blocks with the target boundary as a boundary is intra-coded; setting the bS value of the target boundary to bS1 when none of the two blocks with the target boundary as a boundary is intra-coded and the target boundary is a deblocking filtering target; and setting the bS value of the target boundary to bS0 when the target boundary is not a deblocking filtering target, and the values of bS0, bS1, and bS2 may satisfy a relationship of bS0<bS1<bS2.

The case in which the bS is set to bS1 may be not the case in which at least one of the two blocks with the target boundary as a boundary is intra-coded and may include: a case in which at least one of two blocks with the target boundary as a boundary includes a transform coefficient other than 0; and a case in which the two blocks with the target boundary as a boundary have different reference pictures or different motion vectors.

The step of deriving the boundary of the deblocking filtering unit block and the step of setting the bS may be first performed on vertical edges in a picture including the deblocking filtering unit block and may be then performed on horizontal edges in the picture including the deblocking filtering unit blocks.

The deblocking filtering unit block may be any one of a coding block, a transform block, a prediction block, and an 8×8 pixel block. The bS setting unit block may be a 4×4 pixel block.

According to another aspect of the present invention, there is provided a deblocking filtering method including the steps of: setting a boundary strength (bS) of a target boundary by bS setting unit blocks; and applying deblocking filtering on the target boundary by deblocking filtering unit blocks, wherein the step of setting the bS includes setting the bS value of the target boundary corresponding to the deblocking filtering unit block as the boundary of the bS setting unit block.

The step of setting the bS may include: setting the bS value of the target boundary to bS2 when at least one of two blocks with the target boundary as a boundary is intra-coded; setting the bS value of the target boundary to bS1 when none of two blocks with the target boundary as a boundary is intra-coded and the target boundary is a deblocking filtering target; and setting the bS value of the target boundary to bS0 when the target boundary is not a deblocking filtering target, and the values of bS0, bS1, and bS2 may satisfy a relationship of bS0<bS1<bS2.

The case in which the bS is set to bS1 may be not the case in which at least one of two blocks with the target boundary as a boundary is intra-coded and may include: a case in which at least one of two blocks with the target boundary as a boundary includes a transform coefficient other than 0; and a case in which the two blocks with the target boundary as a boundary have different reference pictures or different motion vectors.

The step of deriving the boundary of the deblocking filtering unit block and the step of setting the bS may be first performed on vertical edges in a picture including the deblocking filtering unit block and may be then performed on horizontal edges in the picture including the deblocking filtering unit blocks.

When the bS value set for the target boundary is larger than bS0 and the deblocking filtering is performed thereon, it may be determined which of strong filtering and weak filtering should be performed.

The determination on which of strong filtering and weak filtering should be performed may be performed on the basis of samples of the two blocks with the target boundary as a boundary, and the determination on which of strong filtering and weak filtering should be performed may be performed on the basis of samples to be subjected to the deblocking filtering out of samples in sample rows with the target boundary as a boundary when the target boundary is a vertical edge and on the basis of samples to be subjected to the deblocking filtering out of samples in sample columns with the target boundary as a boundary when the target boundary is a horizontal edge.

When it is determined that the weak filtering should be performed, the filtering may be performed on the samples selected from the samples to be subjected to the deblocking filtering.

The deblocking filtering unit block may be any one of a coding block, a transform block, a prediction block, and an 8×8 pixel block. The bS setting unit block may be a 4×4 pixel block.

Advantageous Effect

According to the aspects of the present invention, it is possible to reconstruct an image to be close to an original image by effectively removing deblocking artifacts in application of deblocking filtering.

According to the aspects of the present invention, it is possible to enhance compression efficiency by reducing complexity in application of deblocking filtering.

According to the aspects of the present invention, it is possible to reduce complexity by effectively setting a unit block for deciding a bS (boundary strength) value in application of deblocking filtering. According to the aspects of the present invention, it is also possible to reduce complexity by effectively setting a bS value in application of deblocking filtering.

BRIEF DESCRIPTION OF THE DRAWINGS

FIGS. 7 and 8 are diagrams schematically illustrating other examples of the method of determining a bS value.

DESCRIPTION OF EXEMPLARY EMBODIMENTS

Figure 1:
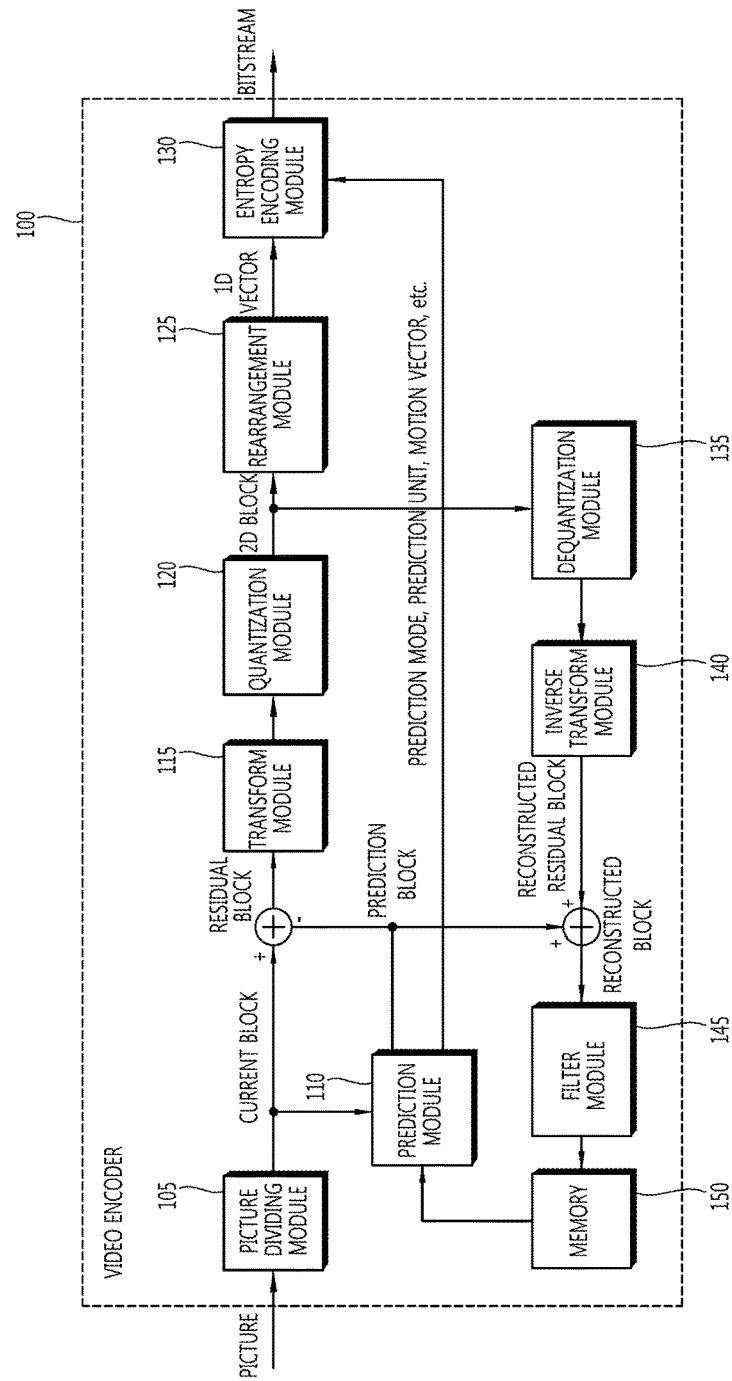
FIG. 1 is a block diagram schematically illustrating an encoding apparatus (video encoder) according to an embodiment of the invention.

The present invention may be variously modified in various forms, and specific embodiments thereof will be described and illustrated in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions in a video encoding/decoding apparatus and does not mean that the elements are embodied by independent hardware or independent software. For example, two or more elements of the elements may be combined to form a single element, or one element may be divided into plural elements. The embodiments in which the elements are combined and/or divided belong to the scope of the invention without departing from the concept of the invention.

Hereinafter, exemplary embodiments of the invention will be described in detail with reference to the accompanying drawings. Like constituents in the drawings will be referenced by like reference numerals and will not be repeatedly described.

FIG. 1 is a block diagram schematically illustrating an encoder (video encoder) according to an embodiment of the invention. Referring to FIG. 1, a video encoder 100 includes a picture dividing module 105, a prediction module 110, a transform module 115, a quantization module 120, a rearrangement module 125, an entropy encoding module 130, a dequantization module 135, an inverse transform module 140, a filter module 145, and a memory 150.

The picture dividing module 105 may divide an input picture into at least one processing unit blocks. Here, a block as a processing unit may be a prediction unit (hereinafter, referred to as a "PU"), a transform unit (hereinafter, referred to as a "TU"), or a coding unit (hereinafter, referred to as a "CU").

The prediction module 110 includes an inter prediction module that performs an inter prediction process and an intra prediction module that performs an intra prediction process, as will be described later. The prediction module 110 performs a prediction process on the processing units of a picture divided by the picture dividing module 105 to generate a prediction block. In the prediction module 110, the processing unit of a picture may be a CU, a TU, or a PU. The prediction module 110 may determine whether the prediction performed on the corresponding processing unit is an inter prediction or an intra prediction, and may determine specific details (for example, a prediction mode) of the prediction methods. The processing unit subjected to the prediction process may be different from the processing unit of which the prediction method and the specific details are determined. For example, the prediction method and the prediction mode may be determined in the units of PU and the prediction process may be performed in the units of TU.

In the inter prediction, a prediction process may be performed on the basis of information on at least one of a previous picture and/or a subsequent picture of a current picture to generate a prediction block. In the intra prediction, a prediction process may be performed on the basis of pixel information of a current picture to generate a prediction block.

In the inter prediction, a skip mode, a merge mode, an MVP (Motion Vector Prediction) mode, and the like may be used. In the inter prediction, a reference picture may be selected for a PU, and a reference block having the same size as the PU may be selected by integer pixel samples. Then, a prediction block in which a residual signal from the current PU is minimized and the motion vector magnitude is minimized is generated.

The prediction block may be generated in the unit of integer pixel samples or in the unit of pixel samples less than an integer pixel such as ½ pixel samples and ¼ pixel samples. Here, the motion vector may also be expressed in the unit of pixel samples less than an integer pixel. For example, luma pixels may be expressed in the unit of ¼ pixels and aroma pixels may be expressed in the unit of ⅛ pixels.

Information such as an index, a motion vector (for example, a motion vector predictor), and a residual signal of a reference picture selected through the inter prediction is entropy-encoded and is transmitted to a decoder. When the skip mode is applied, a prediction block may be used as a reconstructed block and thus the residual signal may not be generated, transformed, quantized, and transmitted at all.

When the intra prediction is performed, the prediction mode may be determined in the unit of PU and the prediction process may be performed in the unit of PU. Alternatively, the prediction mode may be determined in the unit of PU and the inter prediction may be performed in the unit of TU.

The prediction modes in the intra prediction may include 33 directional prediction modes and at least two non-directional modes. The non-directional modes may include a DC prediction mode and a planar mode.

In the intra prediction, a prediction block may be derived after a filter is applied to a reference sample. At this time, it may be determined whether a filter should be applied to a reference sample depending on the intra prediction mode and/or the size of a current block.

A PU may be a block having various sizes and shapes. For example, in case of inter prediction, a PU may be blocks having sizes such as 2N×2N, 2N×N, N×2N, and N×N (where N is an integer). In case of intra prediction, a PU may be blocks having sizes such as 2N×2N and N×N (where N is an integer). A PU with a size of N×N may be set to be applied to only a specific case. For example, the PU with a size of N×N may be set to be used for only a smallest CU or may be set to be used for only the intra prediction. In addition to the PUs with the above-mentioned sizes, PUs such as an N×mN block, an mN×N block, a 2N×mN block, and an mN×2N block (where m<1) may be additionally defined and used.

Residual values (a residual block or a residual signal) between the derived prediction block and the original block are input to the transform module 115. The prediction mode information, the motion vector information, and the like used for the prediction are encoded along with the residual values by the entropy encoding module 130 and are transmitted to the decoder.

The transform module 115 performs a transform process on the residual block in the unit of TU and derives transform coefficients. The transform unit in the transform module 115 may be a TU and may have a quad tree structure. The size of the transform unit may be determined within a predetermined largest and smallest size range. The transform module 115 may transform the residual block using DCT (Discrete Cosine Transform) and/or DST (Discrete Sine Transform).

The quantization module 120 may quantize the residual values transformed by the transform module 115 and may derive quantization coefficients. The values calculated by the quantization module 120 may be supplied to the dequantization module 135 and the rearrangement module 125.

The rearrangement module 125 may rearrange the quantization coefficients supplied from the quantization module 120. By rearranging the quantization coefficients, it is possible to enhance the encoding efficiency in the entropy encoding module 130. The rearrangement module 125 may rearrange the quantization coefficients in the form of a two-dimensional block to the form of a one-dimensional vector through the use of a coefficient scanning method. The rearrangement module 125 may enhance the entropy encoding efficiency in the entropy encoding module 130 by changing the order of coefficient scanning on the basis of stochastic statistics of the coefficients transmitted from the quantization module.

The entropy encoding module 130 may perform an entropy encoding process on the quantization coefficients rearranged by the rearrangement module 125. Examples of the entropy encoding method include an exponential Golomb method, a CAVLC (Context-Adaptive Variable Length Coding) method, and a CABAC (Context-Adaptive Binary Arithmetic Coding) method. The entropy encoding module 130 may encode a variety of information such as residual coefficient information and block type information of a coding unit, prediction mode information, dividing unit information, prediction unit information, transfer unit information, motion vector information, reference picture information, block interpolation information, and filtering information transmitted from the rearrangement module 125 and the prediction module 110.

The entropy encoding module 130 may give a predetermined change to a parameter set or a syntax to be transmitted, if necessary.

The dequantization module 135 dequantizes the values quantized by the quantization module 120. The inverse transform module 140 inversely transforms the values dequantized by the dequantization module 135. The residual values derived by the dequantization module 135 and the inverse transform module 140 are merged with the prediction block predicted by the prediction module 110 to create a reconstructed block.

In FIG. 1, a residual block and a prediction block are added to derive a reconstructed block by an adder. At this time, the adder may be considered as a particular module (reconstructed block generating module) that generates a reconstructed block.

The filter module 145 applies a deblocking filter, an ALF (Adaptive Loop Filter), an SAO (Sample Adaptive Offset) to the reconstructed picture.

The deblocking filter removes a block distortion generated at the boundary between blocks in the reconstructed picture. The ALF performs a filtering process on the basis of the result values of the comparison of the original picture with the reconstructed picture of which the blocks are filtered by the deblocking filter. The ALF may be applied only when high efficiency is necessary. The SAO reconstructs offset differences between the residual blocks having the deblocking filter applied thereto and the original picture and is applied in the form of a band offset, an edge offset, or the like.

On the other hand, the filter module 145 may not perform a filtering process on a reconstructed block used for the inter prediction.

The memory 150 stores the reconstructed block or picture calculated by the filter module 145. The reconstructed block or picture stored in the memory 150 is supplied to the prediction module 110 that performs the inter prediction.

Figure 2:
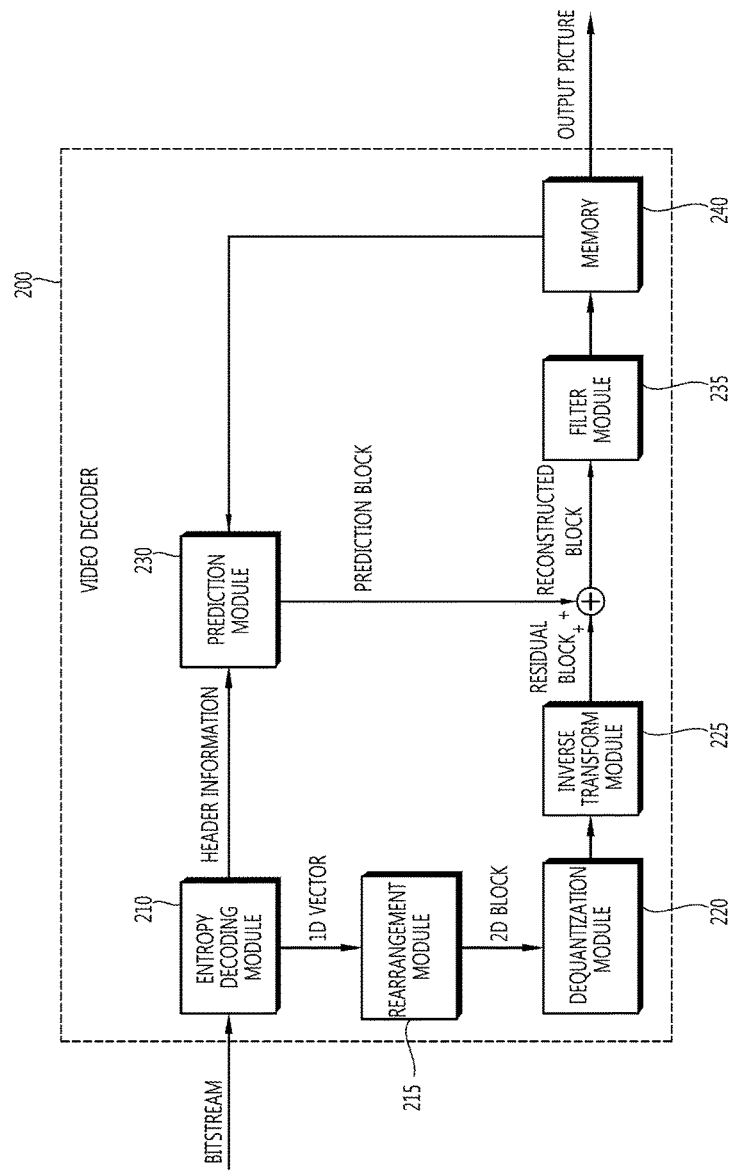
FIG. 2 is a block diagram schematically illustrating a video decoder according to an embodiment of the invention.

FIG. 2 is a block diagram schematically illustrating a video decoder according to an embodiment of the invention. Referring to FIG. 2, a video decoder 200 includes an entropy decoding module 210, a rearrangement module 215, a dequantization module 220, an inverse transform module 225, a prediction module 230, a filter module 235, and a memory 240.

When a video bitstream is input from the video encoder, the input bitstream is decoded on the basis of the order in which video information is processed by the video encoder.

For example, when the video encoding device uses a variable length coding (hereinafter, referred to as "VLC") method such as the CAVLC to perform the entropy encoding process, the video decoding module 210 may realize the same VLC table as used in the video encoding device and can perform the entropy decoding process. When the video encoding device uses the CABAC to perform the entropy encoding process, the entropy decoding module 210 may perform the entropy decoding process using the CABAC to correspond thereto.

Information for generating a prediction block out of the information decoded by the entropy decoding module 210 is supplied to the prediction module 230, and the residual values entropy-decoded by the entropy decoding module are input to the rearrangement module 215.

The rearrangement module 215 rearranges the bitstream entropy-decoded by the entropy decoding module 210 on the basis of the rearrangement method in the video encoding device. The rearrangement module 215 reconstructs and rearranges coefficients expressed in the form of one-dimensional vector into coefficients of a two-dimensional block form. The rearrangement module 215 is supplied with information associated with the coefficient scanning performed by the encoding module and may perform the rearrangement using a method of inversely scanning the coefficients on the basis of the scanning order in which the scanning is performed by the corresponding encoding module.

The dequantization module 220 performs dequantization on the basis of the quantization parameters supplied from the encoder and the rearranged coefficient values of the block.

The inverse transform module 225 performs the inverse DCT and inverse DST of the DCT and DST, which has been performed by the transform module of the video encoding device, on the quantization result from the video encoding device. The inverse transform is performed on the basis of a transfer unit or a division unit of a picture determined by the video encoding device. The transform module of the video encoding device selectively performs the DCT and DST depending on plural information elements such as the prediction method, the size of the current block, and the prediction direction, and the inverse transform module 225 of the video decoding device performs the inverse transform on the basis of the transform information on the transform performed by the transform module of the video encoding device.

The prediction module 230 generates a prediction block on the basis of prediction block derivation information supplied from the entropy decoding module 210 and the previously-decoded block and/or picture information supplied from the memory 240.

When the prediction mode of a current PU is an intra prediction mode (intra mode), an intra prediction process of generating a prediction block on the basis of pixel information in the current picture may be performed.

When the prediction mode of a current PU is an inter prediction mode (inter mode), an inter prediction process may be performed on the current PU on the basis of information included in at least one of a previous picture or a subsequent picture of the current picture. At this time, motion information necessary for the inter prediction of the current PU supplied from the video encoder, for example, information on motion vectors and reference picture indices, may be derived from a skip flag, a merge flag, and the like received from the encoder.

A reconstructed block is derived using the prediction block generated by the prediction module 230 and the residual block supplied from the inverse transform module 225. In FIG. 2, the prediction block and the residual block are added to derive a reconstructed block by an adder. At this time, the adder may be considered as a particular module (reconstructed block generating module) that generates a reconstructed block.

When the skip mode is used, the residual block may be not transmitted and the prediction block may be used as the reconstructed block.

The reconstructed block and/or picture may be supplied to the filter module 235. The filter module 235 may perform a deblocking filtering process, an SAO (Sample Adaptive Offset) process, and/or an adaptive loop filtering process on the reconstructed block and/or picture.

The memory 240 may store the reconstructed picture or block for use as a reference picture or a reference block and may supply the reconstructed picture to the output module.

On the other hand, as described above, the filter modules of the encoder and the decoder may use a deblocking filter, an ALF (Adaptive Loop Filter), or an SAO (Sample Adaptive Offset) as an in-loop filter.

The deblocking filter removes artifacts between blocks due to the prediction, transform, quantization in the unit of a block. The deblocking filter may be applied to a prediction unit edge or a transform unit edge and a predetermined smallest block size may be set for application of the deblocking filter.

In order to apply the deblocking filter, a boundary strength (bS) of a horizontal or vertical filter boundary is first determined. Then, it is determined whether the filtering should be performed in the unit of blocks on the basis of the bS. When it is determined that the filtering should be performed, what filter should be applied is determined. A filter to be applied may be selected from a weak filter and a strong filter. The filter module applies the selected filter to the boundary of the corresponding block.

The ALF (Adaptive Loop Filter) may be performed after the SAO to be described later is performed. The ALF functions to compensate for an encoding error using a Wiener filter and is globally applied to slices unlike the SAO. The ALF may be performed in case of only HE (High Efficiency).

The SAO is a procedure of reconstructing an offset difference of an image, which has been subjected to the deblocking filtering, from an original image in the unit of pixels. A coding error may be compensated for through the SAO and the coding error may be based on quantization or the like. The SAO is classified into two types of a band offset and an edge offset.

As described above, when an picture is reconstructed in the unit of blocks (for example, CU, PU, and TU), block distortion may occur in the boundaries between the reconstructed blocks. A deblocking filter may be applied to prevent the block distortion. The deblocking filter may be selectively applied to a position at which the block distortion is likely to occur in the same image or picture and a position at which the block distortion is not likely to occur. For example, the deblocking filter may be applied in different ways to the position at which the block distortion is likely to occur and the position at which the block distortion is not likely to occur.

For this purpose, boundary strength (hereinafter, referred to as "bS") of a boundary between blocks may be determined depending on whether the boundary between blocks corresponds to a boundary to which the deblocking filter should be applied, whether neighboring blocks are blocks having intra coding applied thereto, or the like, and the deblocking filtering may be applied on the basis of the determined bS.

On the other hand, when a CU is an I_PCM CU, that is, when a CU is a PCM (Pulse Coding Modulation) CU to which intra prediction should be applied, the deblocking filtering is not performed. Since the I_PCM mode does not require the quantization and transform processes, the same values as the original data are reconstructed.

Therefore, in order to reconstruct the best image quality (original image quality), the in-loop filter Is not applied to a CU of the I_PCM mode (I_PCM CU). For example, in the deblocking filtering process, the deblocking filter is prevented from being applied to the I_PCM CU by setting the quantization parameter qP of the I-PCM CU to 0 (zero).

Figure 3:
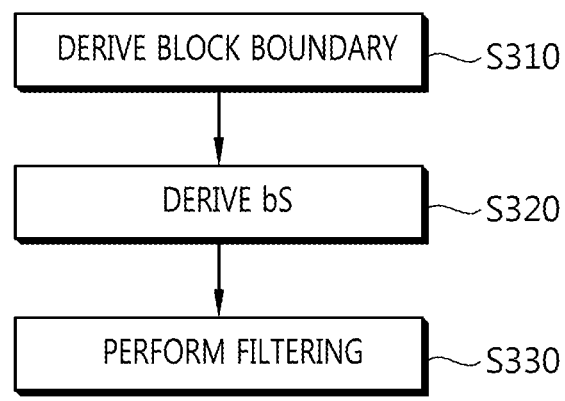
FIG. 3 is a flowchart schematically illustrating a method of applying a deblocking filter according to the invention.

FIG. 3 is a flowchart schematically illustrating a method of applying a deblocking filter according to the invention. The deblocking filtering illustrated in FIG. 3 may be performed by an encoder and a decoder. For example, the filtering modules illustrated in FIGS. 1 and 2 may perform the deblocking filtering process illustrated in FIG. 3.

The deblocking filtering is first applied to vertical edges between blocks in a current picture and is then applied to horizontal edges between blocks in the current picture. The deblocking filtering is applied to the horizontal edges in the current picture with the modified sample by deblocking filtering of vertical edges.

Therefore, the deblocking filtering procedure illustrated in FIG. 3 may be first applied to the vertical edges in the current picture and then may be applied to the horizontal edges in the current picture.

Referring to FIG. 3 for the edge between blocks, a block boundary is derived for application of the deblocking filtering (S310).

The filter module may set the size of a current coding block or a current LCU (Largest Coding Unit) (hereinafter, a coding block in this description includes an LCU for the purpose of convenience for explanation) and may determine whether the boundary of the current coding block is a boundary of a current picture, whether the boundary of the current coding block is a boundary to which the deblocking filter is applied as a boundary of a tile, and whether the boundary of the current coding block is a boundary to which the deblocking filter as a boundary of a slice.

For example, when the deblocking filter is applied to vertical edges and the left boundary of the current coding block is the left boundary of the current picture, the left boundary of the current coding block may be be removed from the target of the deblocking filtering. When the left boundary of the current coding block is the left boundary of the current tile and a filter is determined not to be applied to the edges of the current tile or when the left boundary of the current coding block is the left boundary of the current slice and a filter is determined not to be applied to the edges of the current slice, the left boundary of the current coding block may be removed from the target of the deblocking filtering. Therefore, otherwise, in application of the deblocking filtering to the vertical edges, the deblocking filtering may be applied to the left boundary of the current coding block.

When the deblocking filter is applied to horizontal edges and the top boundary of the current coding block is the top boundary of the current picture, the top boundary of the current coding block may be removed from the target of the deblocking filtering. When the top boundary of the current coding block is the top boundary of the current tile and a filter is determined not to be applied to the edges of the current tile or when the top boundary of the current coding block is the top boundary of the current slice and a filter is determined not to be applied to the edges of the current slice, the top boundary of the current coding block may be removed from the target of the deblocking filtering. Otherwise, in application of the deblocking filtering to the horizontal edges, the deblocking filtering may be applied to the top boundary of the current coding block.

The application of the filtering on a boundary (or to a boundary) in this description means that the filtering is performed on predetermined samples located on both sides of the boundary.

The filter module may derive block boundaries of vertical edges of a transform block and a prediction block when the deblocking filtering is applied to vertical edges of a picture, and may derive block boundaries of horizontal edges of the transform block and the prediction block when the deblocking filtering is applied to horizontal edges of the picture.

When the edge of the transform block is an edge of a coding block, the boundary of the transform block may be derived for the corresponding edge depending on whether the deblocking filtering should be applied to the corresponding edge. When the transform block is divided, the boundaries of the divided blocks may be derived.

The filter module may derive the boundary of each partition of a prediction block. For example, when the partitions of a prediction block are 2N×N pixel blocks, N×N pixel blocks, 2N×nU pixels, or 2N×nD pixel blocks (where U, U, and D are integers corresponding to the number of pixels and n is an integer corresponding to the number of prediction blocks in a coding block), an edge for each partition may be derived.

Subsequently, the bS of the block boundary to which the deblocking filter should be applied is derived (S320). The bS is determined for each edge in the current coding block. The bS is derived for each vertical edge when the deblocking filtering is applied to the vertical edges in a picture, and the bS is derived for each horizontal edge when the deblocking filtering is applied to the horizontal edges in the picture.

The derivation of the bS may be performed for each predetermined unit. For example, the bS may be derived for each edge of a transform block or may be derived for each edge of a prediction block. Also, the bS may be derived in the unit of blocks with a predetermined size, for example, in the unit of 8×8 pixel blocks or 4×4 pixel blocks.

In addition, the bS may be derived for an edge of a block satisfying a specific condition out of a transform block, a prediction block, and a predetermined-sized block in a current coding block. For example, the bS may be derived for each larger block of the smaller block of a transform block (for example, UU) and a prediction block (for example, PU) and a predetermined-size block (for example, 8×8 pixel block).

In other words, the bS may be determined in the unit of pixels corresponding to the size of the block which is a unit for determining the bS (for example, L pixel unit when the bS setting unit is a L×L pixel block (L is an integer)) at the boundary of a block to be subjected to the deblocking filtering. The specific derivation of the bS will be described later.

Subsequently, a filtering process is performed on the block boundary on the basis of the bS (S330).

For example, in case of luma samples, when the bS for a target edge is equal to or less than a predetermined reference bS, for example, $bS_{th1}$, the deblocking filtering may not be applied to the corresponding edge. In case of chroma samples, when the bS for a target edge is equal to or less than a predetermined reference bS, for example, $bS_{th2}$, the deblocking filtering may not be applied to the corresponding edge. The reference bS values $bS_{th1}$ and $bS_{th2}$ may be set to be equal to or different from each other.

In order to efficiently apply the deblocking filtering, an additional threshold value (referred to as Th1 for the purpose of convenience for explanation) may be set. For example, when the reference bS value is set to 0 and the bS value for a target edge is larger than 0, the ON/OFF of the deblocking filtering at the level of blocks may be determined using Th1. For example, when the value derived from the target edge is larger than Th1, the deblocking filtering may be applied to the target edge.

An example where the deblocking filtering is applied to vertical edges in a picture will be first described. As the value derived from a target vertical edge for the purpose of comparison with Th1, a difference between filtering target samples in two blocks with the vertical edge as a boundary in a specific sample row may be considered. For example, the sum $DL_k$ of differences (the sum of a difference between the first sample from the vertical edge and the second sample from the vertical edge and a difference between the third sample from the vertical edge and the second sample from the vertical edge, for example, when three samples from the vertical edge should be subjected to the filtering) between filtering target samples adjacent to the vertical edge in the left block of the vertical edge out of the samples in the k-th sample row (where k is an integer) may be calculated, and the sum $DR_k$ of differences (the sum of a difference between the first sample from the vertical edge and the second sample from the vertical edge and a difference between the third sample from the vertical edge and the second sample from the vertical edge, for example, when three samples from the vertical edge should be subjected to the filtering) between filtering target samples adjacent to the vertical edge in the right block of the vertical edge may be derived. The sum $D_k$ of $DL_k$ and DR, may be compared with Th1 and the deblocking filtering may be applied to the vertical edge when $D_k$ is smaller than Th1. When $D_k$ is smaller than Th1, it may be considered that the vertical boundary is not a boundary (for example, an actual image boundary in an original picture) to which it is not effective to apply the deblocking filtering on the basis of the quantization parameter and it may be determined that a picture is reconstructed closer to the original picture by applying the deblocking filtering.

At this time, in two blocks with the vertical edge as a boundary, the sum of differences between neighboring filtering target samples in plural sample rows may be considered instead of considering the sum of differences between neighboring filtering target samples in only one sample row. For example, in two blocks with the vertical edge as a boundary, when the sum D ($=D_k+D_{k+j}$) the sum $D_k$ of differences between filtering target samples in the k-th sample row and the sum $D_{k+j}$ of differences between filtering target samples in the (k+j)-th sample row (where k is an integer) is smaller than the threshold value Th1, it may be determined that the deblocking filter should be applied to the vertical edge.

An example where the difference j between two sample rows is set to 3 will be described below. When D ($=D_2+D_5$) for the second sample row and the fifth sample row is smaller than Th1, the deblocking filter may be applied to the corresponding vertical edge. When the difference j between two sample rows is set to 3 and the sum D ($=D_0+D_3$) for the zeroth sample row and the third sample row is smaller than Th1, the deblocking filter may be applied to the corresponding vertical edge.

At this time, in order to effectively reflect characteristics of each block and each sample row, the D values which are the absolute values of the sums between differences between filtering target samples for each sample row and each block may be derived. In this case, the D value for the k-th sample row and the (k+j)-th sample row of the left block (L) and the right block (R) with the vertical edge as a boundary may be derived by Expression 1.

$$D=\text{abs}(DL_k)+\text{abs}(DL_{k+j})+\text{abs}(DR_k)+\text{abs}(DR_{k+j}) \quad \text{<Expression 1>}$$

As described above, $DL_K$ is the sum of differences between the filtering target samples adjacent to the vertical edge in the k-th sample row of the left block. For example, when three samples adjacent to the vertical edge are the application target of the deblocking filtering, $DL_K$ may be derived by the sum of the difference between the first sample from the vertical edge and the second sample from the vertical edge in the k-th sample row of the left block of the vertical edge and the difference between the third sample from the vertical edge and the second sample from the vertical edge. $DR_K$ is the sum of differences between the filtering target samples adjacent to the vertical edge in the k-th sample row of the right block. For example, when three samples adjacent to the vertical edge are the application target of the deblocking filtering, $DR_K$ may be derived by the sum of the difference between the first sample from the vertical edge and the second sample from the vertical edge in the k-th sample row of the right block of the vertical edge and the difference between the third sample from the vertical edge and the second sample from the vertical edge.

When the sum of differences between the adjacent filtering target samples is taken in consideration of plural sample rows as described above, the deblocking filtering may be more effectively applied by considering the sum of differences between the adjacent filtering target samples in each sample row. For example, $D_k$ may be defined as expressed by Expression 2 by referring to Expression 1 and considering only the k-th sample row.

$$D_k = abs(DL_k) + abs(DR_k) \qquad \text{<Expression 2>}$$

For example, when the k-th sample row and the (k+3)-th sample row are considered for the vertical edge as described above and D is smaller than Th1, and $D_k$ for the k-th sample row and $D_{k+3}$ for the (k+3)-th sample row are each smaller than a half of Th1 (Th½), strong filtering may be applied to the vertical edge. On the other hand, when D is smaller than Th1 but $D_k$ is not smaller than Th½ or $D_{k+3}$ is not smaller than Th½, weak filtering may be applied to the vertical edge.

When the weak filtering is applied, the filtering may be applied to only specific samples out of the filtering target samples. In this case, a filtering coefficient other than that in the strong filtering may be applied. For example, when the filtering target samples are six samples (three samples on the left side and three samples on the right side) located on the left and right sides of the vertical edge, the strong filtering may be applied to all the filtering target samples and the weak filtering may be applied to two samples located on the left side of the target edge and two samples located on the right side of the target edge. At this time, the filtering coefficients of the strong filtering and the weak filtering may be different from each other.

An example where the deblocking filtering is applied to horizontal edges in a picture will be described below. As the value derived from a target horizontal edge for the purpose of comparison with Th1, a difference between filtering target samples in two blocks with the horizontal edge as a boundary in a specific sample column may be considered. As described in the example for the horizontal edge, the sum $DT_k$ of differences (the sum of a difference between the first sample from the horizontal edge and the second sample from the horizontal edge and a difference between the third sample from the horizontal edge and the second sample from the horizontal edge, for example, when three samples from the horizontal edge should be subjected to the filtering) between filtering target samples adjacent to the horizontal edge in the top block of the horizontal edge out of the samples in the k-th sample column (where k is an integer) may be calculated, and the sum $DB_k$ of differences (the sum of a difference between the first sample from the horizontal edge and the second sample from the horizontal edge and a difference between the third sample from the horizontal edge and the second sample from the horizontal edge, for example, when three samples from the horizontal edge should be subjected to the filtering) between filtering target samples adjacent to the horizontal edge in the bottom block of the horizontal edge may be derived. The sum $D_k$ of $DL_k$ and $DR_k$ may be compared with Th1 and the deblocking filtering may be applied to the horizontal edge when $D_k$ is smaller than Th1.

At this time, in two blocks with the horizontal edge as a boundary, the sum of differences between neighboring filtering target samples in plural sample columns may be considered. For example, in two blocks with the horizontal edge as a boundary, when the sum $D (=D_k+D_{k+j})$ the sum $D_k$ of differences between filtering target samples in the k-th sample column and the sum $D_{k+j}$ of differences between filtering target samples in the (k+j)-th sample column (where k is an integer) is smaller than the threshold value Th1, it may be determined that the deblocking filter should be applied to the horizontal edge.

An example where the difference j between two sample columns is set to 3 will be described below. When D $(=D_2+D_5)$ for the second sample column and the fifth sample column is smaller than Th1, the deblocking filter may be applied to the corresponding horizontal edge. When the difference j between two sample columns is set to 3 and the sum D $(=D_0+D_3)$ for the zeroth sample column and the third sample column is smaller than Th1, the deblocking filter may be applied to the corresponding horizontal edge.

The sample rows considered for the vertical edge and the sample columns considered for the horizontal edge may be sample rows and sample columns corresponding to each other. For example, when the zeroth sample row and the third-sample row are considered for the vertical edge, the zeroth sample column and the third sample column may be considered for the horizontal edge.

Similarly to the vertical edge, in order to effectively reflect characteristics of each block and each sample column, the absolute values of the sums between differences between filtering target samples for each sample column and each block may be taken. In this case, the D value for the k-th sample column and the (k+j)-th sample column of the top block (T) and the bottom block (B) with the horizontal edge as a boundary may be derived by Expression 3.

$$D = abs(DT_k) + abs(DT_{k+j}) + abs(DB_k) + abs(DB_{k+j}) \qquad \text{<Expression 3>}$$

As described above, $DT_K$ is the sum of differences between the filtering target samples adjacent to the horizontal edge in the k-th sample column of the top block. For example, when three samples adjacent to the horizontal edge are the application target of the deblocking filtering, $DT_K$ may be derived by the sum of the difference between the first sample from the horizontal edge and the second sample from the horizontal edge in the k-th sample column of the top block of the horizontal edge and the difference between the third sample from the horizontal edge and the second sample from the horizontal edge. $DB_K$ is the sum of differences between the filtering target samples adjacent to the horizontal edge in the k-th sample column of the bottom block. For example, when three samples adjacent to the horizontal edge are the application target of the deblocking filtering, $DB_K$ may be derived by the sum of the difference between the first sample from the horizontal edge and the second sample from the horizontal edge in the k-th sample column of the bottom block of the horizontal edge and the difference between the third sample from the horizontal edge and the second sample from the horizontal edge.

As described in the example for the vertical edge, the deblocking filtering may be more effectively applied by considering the sum of differences between the adjacent filtering target samples in each sample column. For example, $D_k$ may be defined as expressed by Expression 4 by referring to Expression 3 and considering only the k-th sample column.

$$D_k = \text{abs}(DT_k) + \text{abs}(DB_k) \qquad \text{<Expression 4>}$$

For example, the k-th sample column and the (k+3)-th sample column are considered for a horizontal edge as described above. When D is smaller than Th1, $D_k$ for the k-th sample column and $D_{k+3}$ for the (k+3)-th sample column are each smaller than a quarter of Th1 (Th¼), and a predetermined relationship with other deblocking parameters is satisfied, strong filtering may be be applied to the horizontal edge. On the other hand, when D is smaller than Th1, but $D_k$ is not smaller than Th¼ or $D_{k+3}$ is not smaller than Th¼, and a predetermined condition is satisfied, weak filtering may be applied to the horizontal edge.

When the weak filtering is applied, the filtering may be applied to only specific samples out of the filtering target samples. In this case, a filtering coefficient other than that in the strong filtering may be applied. For example, when the filtering target samples are six samples (three samples on the top side and three samples on the bottom side) located on the top and bottom sides of the horizontal edge, the strong filtering may be applied to all the filtering target samples and the weak filtering may be applied to two samples located on the top side of the target edge and two samples located on the bottom side of the target edge. At this time, the filtering coefficients of the strong filtering and the weak filtering may be different from each other.

The strong filtering and the weak filtering may be applied to the vertical edges and the horizontal edges using the same method (for example, the same filter coefficient or offset).

As described above, when it is determined whether the deblocking filtering should be applied, which of the strong filter and the weak filter should be applied, and to what sample the weak filter should be applied, the filtering module may apply the deblocking filter on the basis of a predetermined method (for example, the same filter coefficient or offset). As described above, the deblocking filtering may be first applied to the vertical edges in a picture and then the deblocking filtering may be applied to the horizontal edges in the picture.

FIG. 3 illustrates the method of applying the deblocking filtering in rough steps such as the block boundary deriving step (S310), the bS deriving step (S320), and the filtering application step (S33), but the above-mentioned details from the bS decision to the filtering application may be divided into detailed steps.

For example, the following steps may be performed for the horizontal deblocking filtering on the vertical edges in a picture: (1) determining the bS of a vertical edge in a coding block (which may be an LCU), wherein the bS decision target edge may be an edge of the smaller block of TU and PU, may be an edge of a predetermined unit block (for example, 8×8 pixel block), or may be an edge of the large block of the smaller unit block of TU and PU and the predetermined unit block; (2) determining ON/OFF of the deblocking filtering at the block level for an edge of which the bS is larger than 0, wherein predetermined sample rows (for example, the second sample row and the fifth sample row) in the blocks on both sides of the boundary (edge) may be used for this purpose as described above; (3) determining which of the strong filtering and the weak filtering should be applied to a region in which the filtering is turned on; (4) determining ON/OFF of additional filtering when the weak filtering is applied, wherein the ON/OFF of additional filtering includes determining ON/OFF of filtering for each specific sample as described above; and (5) repeatedly performing the above-mentioned steps on a next coding block (including LCU) in the current picture, wherein the deblocking filtering process is performed on all the vertical edges in the picture.

For example, the following steps may be performed for the vertical deblocking filtering on the horizontal edges in a picture: (1) determining the bS of a horizontal edge in a coding block (which may be an LCU), wherein the bS decision target edge may be an edge of the smaller block of TU and PU, may be an edge of a predetermined unit block (for example, 8×8 pixel block), or may be an edge of the large block of the smaller unit block of TU and PU and the predetermined unit block; (2) determining ON/OFF of the deblocking filtering at the block level for an edge of which the bS is larger than 0, wherein predetermined sample columns (for example, the second sample column and the fifth sample column) in the blocks on both sides of the boundary (edge) may be used for this purpose as described above; (3) determining which of the strong filtering and the weak filtering should be applied to a region in which the filtering is turned on; (4) determining ON/OFF of additional filtering when the weak filtering is applied, wherein the ON/OFF of additional filtering includes determining ON/OFF of filtering for each specific sample as described above; and (5) repeatedly performing the above-mentioned steps on a next coding block (including LCU) in the current picture, wherein the deblocking filtering process is performed on all the horizontal edges in the picture.

Figure 4:
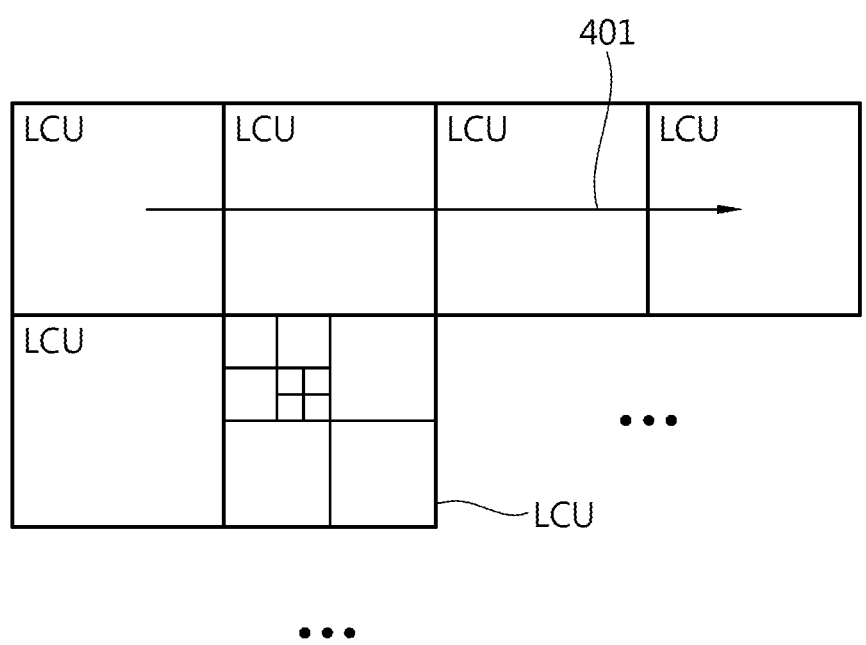
FIG. 4 is a diagram schematically illustrating details of deblocking filtering according to the invention.

FIG. 4 is a diagram schematically illustrating details of the deblocking filtering according to the invention. Referring to FIG. 4, the deblocking filtering (S401) is performed on the edges in the cording block in the unit of coding blocks (for example, LCU). As described above, the deblocking filtering (horizontal filtering) for the vertical edges is performed on the whole current picture and then the deblocking filtering (vertical filtering) for the horizontal edges is performed on the whole current picture.

Figure 5:
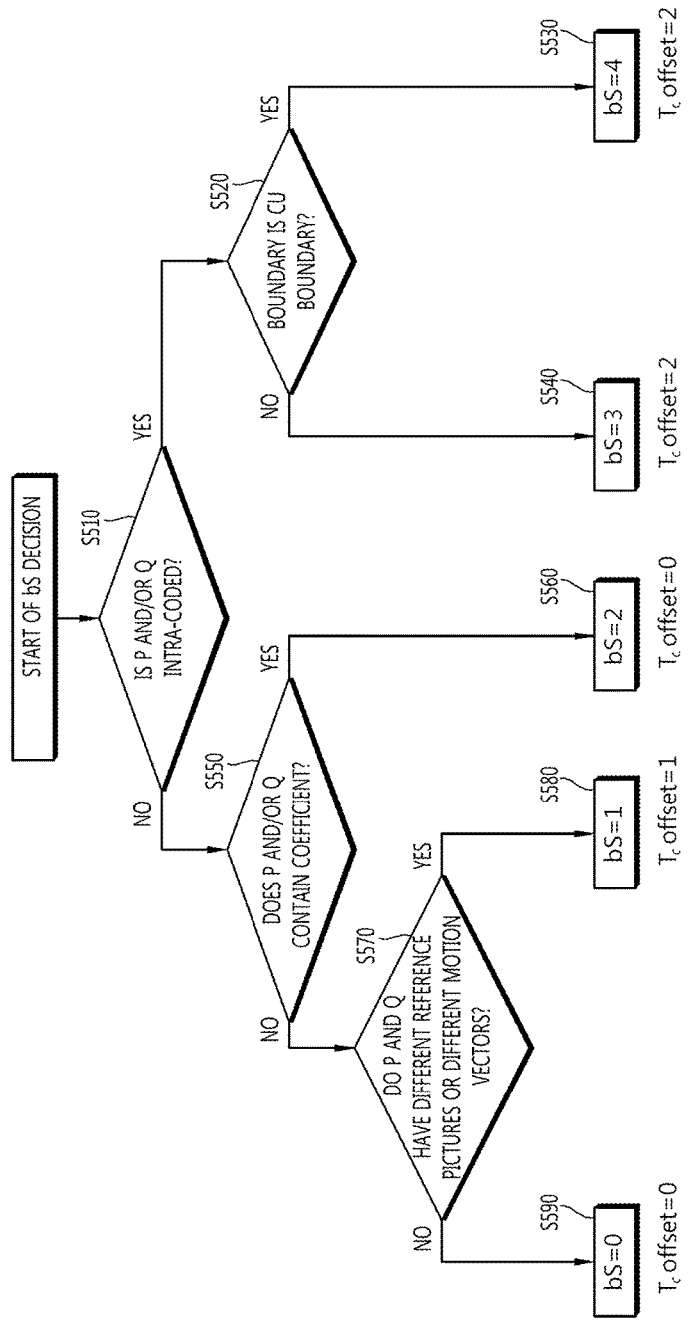
FIG. 5 is a flowchart illustrating schematically illustrating an example of a bS decision method.

FIG. 5 is a flowchart schematically illustrating an example of the bS calculating method.

For the purpose of convenience for explanation, in this description, the current block in the deblocking filtering is represented by Q, and a block adjacent to the current block and earlier encoded/decoded than the current block is represented by P. For example, when the deblocking filtering is performed on a vertical edge, the left block of the vertical edge is represented by P and the right block thereof is represented by Q. When the deblocking filtering is performed on a horizontal edge, the top block of the horizontal edge is represented by P and the bottom block thereof is represented by Q.

A sample belonging to block P is denoted by p, and a sample belonging to block Q is denoted by q. For example, the i-th sample, which belongs to block P, from the boundary (edge) between block P and block Q in a specific sample row or a specific sample column is denoted by $p_i$ (where 1, 2, . . . ). Similarly, the i-th sample, which belongs to block Q, from the boundary (edge) between block P and block Q in a specific sample row or a specific sample column is denoted by $q_i$ (where i=0, 1, 2, . . . ).

Referring to FIG. 5, in order to determine the bS, it is determined whether P and/or Q is intra-coded (S510).

When P and/or Q is intra-coded, it is determined whether the boundary between P and Q is a boundary of a CU (S520). At this time, the boundary of a CU may be a boundary of an LCU.

When it is determined in step S520 that the boundary between P and Q is the boundary of a CU, the bS value of the boundary between P and Q is determined to be 4 (S530).

When it is determined in step S520 that the boundary between P and Q is not the boundary of a CU, the bS value of the boundary between P and Q is determined to be 3 (S540).

When it is not the case that P and/or Q is intra-coded (i.e. it is a case that none of P and Q is intra-coded), it is determined whether P and/or Q includes a coefficient (transform coefficient) other than 0 (S550). At this time, the filter module may determine whether a transform coefficient other than 0 is present on the basis of the transform coefficient which has not been dequantized. The filter module may determine whether a transform coefficient other than 0 is present on the basis of the transform coefficient which has been dequantized.

When it is determined in step S550 that P and/or Q includes a coefficient (transform coefficient other than 0), the bS value of the boundary between P and Q is determined to be 2 (S560).

When it is determined in step S550 that P and/or Q does not include a coefficient (transform coefficient other than 0), it is determined whether P and Q have different reference pictures or different motion vectors (S570).

When it is determined in step S570 that P and Q have different reference pictures or different motion vectors, the bS value of the boundary between P and Q is determined to be 1 (S580).

Otherwise, that is, when the deblocking filtering should not be performed, the bS value of the boundary between P and Q is set to 0 (S590). In FIG. 5, a case where the above-mentioned conditions are not satisfied at all is illustrated as an example where the bS is not applied.

On the other hand, the values of coefficients necessary for the deblocking filtering may be set depending on the bS values.

The parameter $T_C$offset shown in FIG. 5 may be mentioned as an example. $T_C$offset is a parameter set by a user so as to determine the values of $T_C$ optimized for image characteristics. $T_C$ is one of threshold values used to determine a parameter associated with the deblocking filtering by quantifying blocking artifacts corresponding to the degree of quantization.

FIG. 5 illustrates an example where $T_C$offset is set to 0 when the bS value is 0, 1, or 2 and $T_{C\_}$offset is set to 2 when the bS value is 3 or 4.

On the other hand, in order to effectively apply the deblocking filtering, the unit block and the determination method for determining the bS value, which have been described with reference to FIGS. 3 and 5, may be modified and applied.

The bS values may be determined by units equal to or smaller than the actual deblocking filtering unit block.

For example, when the actual deblocking filtering is performed on luma samples in the unit of 8×8 pixels, the bS values may be determined in the unit of 4×4 pixels. In this way, when the size of the deblocking filtering unit block is larger than the size of the bS setting unit block, the bS values of only the boundaries corresponding to the boundaries (edges) of the deblocking filtering unit block out of the boundaries (edges) of the bS setting unit blocks may be determined. In other words, when the bS is determined by L×L pixel blocks (where L is an integer), the bS values of the boundaries of the deblocking filtering unit block are determined in the unit of L pixels.

Specifically, the block unit in which the bS is determined is a 4×4 pixel block and the actual deblocking filtering is performed in the unit of 8×8 pixel blocks. That is, the bS value is determined in the unit of 4 pixels for the boundary of the 8×8 pixel block which is the deblocking filtering unit block. Therefore, the bS values of the edges of 4×4 pixel blocks in the 8×8 pixel block which is a deblocking filtering unit block do not have to be determined.

Figure 6:
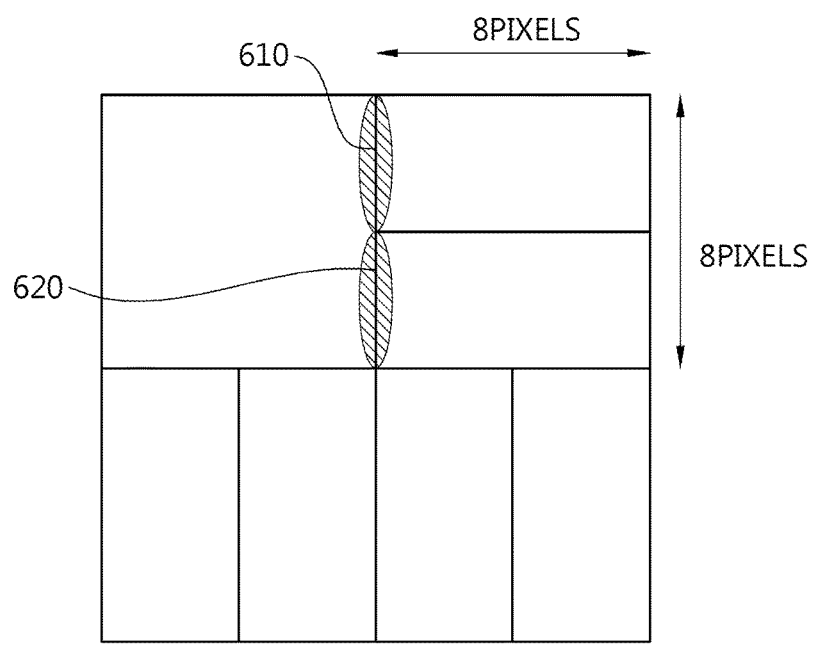
FIG. 6 is a diagram schematically illustrating an example of a method of determining a bS value.

FIG. 6 is a diagram schematically illustrating an example of a method of determining a bS value. FIG. 6 illustrates an example where a deblocking filtering unit block 600 is an 8×8 pixel block and a bS setting unit block is a 4×4 pixel block.

Referring to FIG. 6, a vertical edge and a horizontal edge which are the boundary (edge) of a 4×4 pixel block as the bS setting unit block and the boundary of the deblocking filtering unit block 600 are present in the deblocking filtering unit block 600.

Regarding the vertical edge, two vertical edges 610 and 620 of which the bS will be determined are present in the deblocking filtering unit block 600. In the example illustrated in FIG. 6, the bS of the first vertical edge 610 and the bS of the second vertical edge 620 are compared and the larger bS is determined to be a representative bS of the vertical edges of the deblocking filtering unit block 600.

For example, when the bS of the first vertical edge 610 is 1 and the bS of the second vertical edge 620 is 2, 2 which is the bS value of the second vertical edge 620 may be determined to be the representative bS value of the vertical edges as the left boundary of the deblocking filtering unit block 600.

FIG. 6 illustrates the vertical edges for the purpose of convenience of explanation, but the same method may be applied to the horizontal edges.

When the two bS values are equal to each other in the example illustrated in FIG. 6, one of the two bS values may be used as the representative bS value.

As illustrated in FIG. 6, other examples of the method of not deriving the bS of a boundary located inside the deblocking filtering unit block, that is, the method of deriving the bS of only the boundary of the bS setting unit block which is also the boundary (edge) of the deblocking filtering unit block, will be specifically described below.

Figure 8:
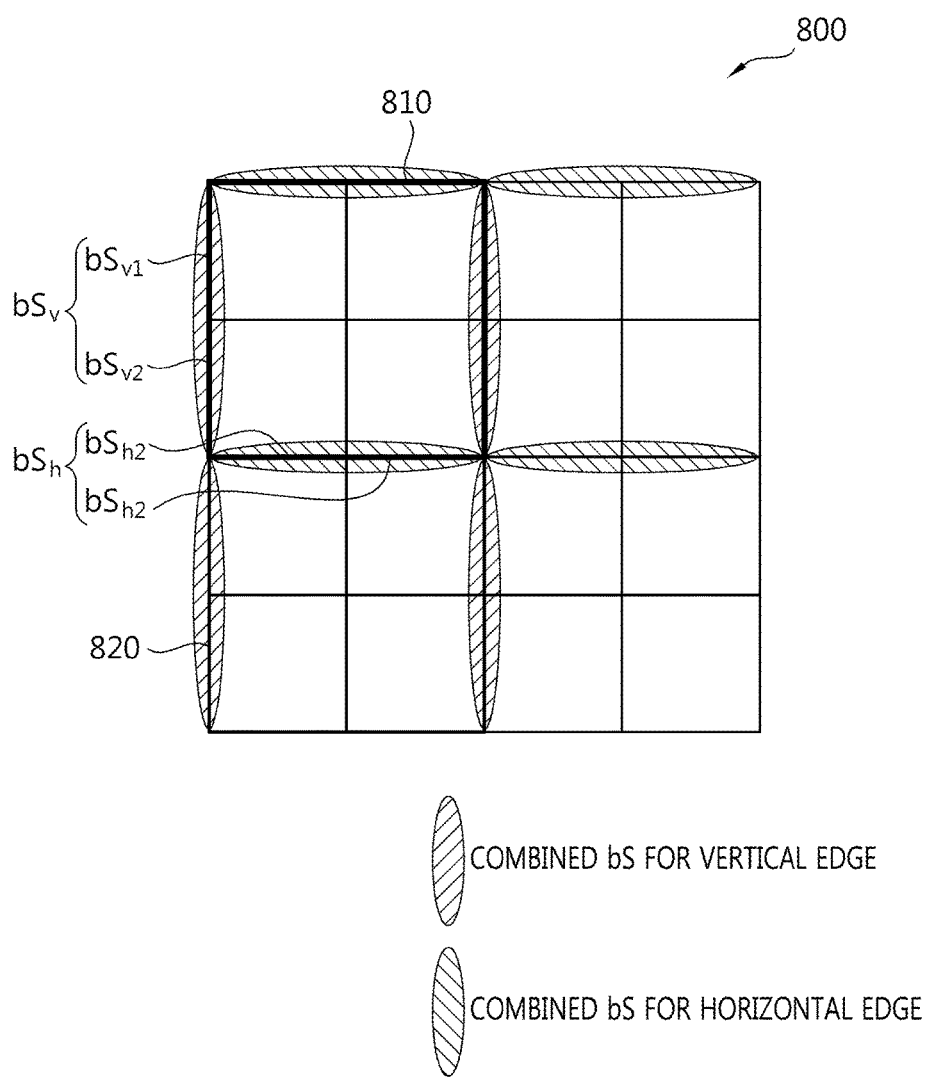

FIGS. 7 and 8 are diagrams schematically illustrating other examples of the method of determining a bS value. In the examples illustrated in FIGS. 7 and 8, a method of setting the bS value through two steps will be described. Specifically, in the examples illustrated in FIGS. 7 and 8, when a 4×4 pixel block is a bS setting unit block and an 8×8 pixel block is a deblocking filtering unit block, the bS is first determined for each 4×4 pixel block and then the bS is reset for each 8×8 pixel block.

FIG. 7 is a diagram schematically illustrating an example of the method of setting a bS for each bS setting unit. Referring to FIG. 7, 4×4 pixel blocks (for example, TUs) as a bS setting unit are present in a 16×16 pixel block (for example, a CU). The bS value may be determined for a boundary of each 4×4 pixel block.

An example (step 1) of a specific process of determining the bS for each 4×4 pixel block is as follows.

<Method of Setting bS for Each 4×4 Pixel Block—Step 1>

It is assumed that the position of a luma sample located at the top-left corner of a current block, for example, a current CU, is specified as (xC, yC) with respect to the luma sample located at the top-left corner of a current picture. It is assumed that a parameter for specifying the size of a CU as the current block is log2CUSize and the horizontal edges and the vertical edges of which the bS is determined are indicated by two-dimensional arrays horEdgeFlags and verEdgeFlags. At this time, the size of the two-dimensional arrays is nS×nS and nS=1<<log2CUSize.

It is assumed that $(xE_k, yE_j)$ specifies a set of positions of samples neighboring to the edge (edge samples). Here, $k=0, \ldots, nE-1$, $j=0, \ldots, nE-1$, nE is set to ((1<<log2CUSize)>>2), and relationships of $xE_0=0$, $yE_0=0$, $xE_{k+1}=xE_k+4$, and $yE_{j+1}=yE_j+4$ are established.

In this case, samples on which the deblocking filtering is performed in the horizontal edges and the vertical edges may be determined on the basis of $(xE_k, yE_j)$ specifying the set of edge sample positions. For example, in a horizontal edge, (1) when the information indicating a horizontal edge indicates that the deblocking filtering will be performed on the edge (the bS of the edge will be determined) (for example, horEdgeFlags[$xE_k$][$yE_j$]=1), (2) $p_0$ may be set to (xC+$xE_k$, yC+$yE_j$−1) of a picture reconstructed by prediction and $q_0$ may be set to (xC+$xE_k$, yC+$yE_j$) of a picture reconstructed by prediction. (3) At this time, the deblocking filtering direction is the vertical direction.

In a vertical edge, (1) when the information indicating a vertical edge indicates that the deblocking filtering will be performed on the edge (the bS of the edge will be determined) (for example, verEdgeFlags[$xE_k$][$yE_j$]=1), (2) $p_0$ may be set to (xC+$xE_k$−1, yC+$yE_j$) of a picture reconstructed by prediction and $q_0$ may be set to (xC+$xE_k$, yC+$yE_j$) of a picture reconstructed by prediction. (3) At this time, the deblocking filtering direction is the horizontal direction.

According to the above-mentioned method (step 1), the number of a 4×4 pixel block as the bS setting unit block in the current CU (current block) (what times the 4 pixels the width and the length of the current CU is) is counted ((1<<log2CUSize)>>2) and the counted value is set as the value of nE. Accordingly, in step 1, the nE bS values may be set in the width and the length in the unit of 4 pixels in the current block $(xE_k, yE_j)$ is increased by 4 pixels $(xE_{k+1}=xE_k+4, yE_{j+1}=yE_j+4)$ so as to determine the bS by 4 pixels, that is, the index is increased so as to perform the bS decision process in the unit of 4×4 pixel blocks in the current block (current CU).

Subsequently to the above-mentioned method (step 1), the bS value set for each bS setting unit block may be re-allocated to each deblocking filter unit block (step 2).

FIG. 8 is a diagram schematically illustrating an example of the method of re-allocating the bS values to each deblocking filtering unit block Referring to FIG. 8, the bS value may be set for each deblocking unit block.

In step 2 illustrated in FIG. 8, the bS values in the unit of 4×4 pixel blocks determined in step 1 are compared with each other and any one value of the bS values of two neighboring edges is used as a representative bS value of the 8×8 deblocking filter unit block.

For example, in FIG. 8, in a left vertical edge of a deblocking filter unit block 810 in the current CU 800, $bS_{v1}$ which is the bS value of the upper edge and $bS_{v2}$ which is the bS value of the lower edge are compared and the larger value may be used as the bS value ($bS_v$) of the left vertical edge of the block 810. In a top horizontal edge of a deblocking filter unit block 820 in the current CU 800, $bS_{h1}$ which is the bS value of the left edge and $bS_{h2}$ which is the bS value of the right edge are compared and the larger value may be used as the bS value ($bS_h$) of the left vertical edge of the block 820. At this time, the bS values of the edges located in the 8×8 pixel block as the deblocking filtering unit block out of the bS values determined in step 1 are not set.

A specific example (step 2) of the process of re-allocating the bS value to each 8×8 pixel block to perform the deblocking filtering is as follows.

<Method of Setting bS for Each 8×8 Pixel Block and Performing Deblocking Filtering—Step 2>

It is assumed that the position of a luma sample located at the top-left corner of a current block, for example, a current CU, is specified as (xC, yC) with respect to the luma sample located at the top-left corner of a current picture. It is assumed that a parameter for specifying the size of a CU as the current block is log2CUSize and an array bS specifies a boundary filtering strength.

The deblocking filtering on a luma edge of the current block, for example, the current CU, may be performed in the following steps.

(1) A parameter nD is set to 1<<(log2CUSize−3).

(2) All elements of a three-dimensional array dEdge with a size of (2)×(nD)×(nD) are initialized to 0.

(3) All elements of a three-dimensional array dSample with a size of (2)×(nD)×(1<<log2CUSize) are initialized to 0.

(4) All elements of a three-dimensional array bStrength with a size of (2)×(nD)×(nD) are initialized to 0.

(5) The value of $xD_k$ is set to xC+(k<<3). At this time, the value of k is equal to $0, \ldots, nD-1$. For each value of $xD_k$, $yD_m$ is set to yC+(m<<3) and the following procedure is performed. At this time, the value of m is equal to $0, \ldots, nD-1$.

(5-1) The boundary filtering strength bSVer of a vertical edge is derived as follows: bSVer=Max(bS[0][$xD_k$][$yD_m$+i]). At this time, the value of i is equal to $0, \ldots, 7$. bS[0][$xD_k$][$yD_m$+i] means the bS value which is the boundary filtering strength of the vertical edge and which is defined with respect to ($xD_k$, $yD_m$+i).

(5-2) The value of bStrength[0][k][m] is set as the value of bSVer.

(5-3) The bS decision process is performed on a luma block edge on the basis of the luma sample position (xC, yC) of the current CU, the luma sample position (xDk, yDm) of the current block, the information indicating that the deblocking filtering is performed on the vertical edge, and the boundary filtering strength bSVer, and the value of dEdge[0][k][m] indicating which of strong filtering and weak filtering should be applied and the dS of an array with a size of 8×8 are determined as the information on the determination.

(5-4) dSample[0][k][(m<<3)+i] for determining the value of dEdge is set to dS[i]. At this time, the value of i is equal to $0, \ldots, 7$.

(5-5) The boundary filtering strength bSHor of a horizontal edge is derived as follows: bSHor=Max(bS[0][$xD_k$+i][$yD_m$]). At this time, the value of i is equal to $0, \ldots, 7$. bS[0][$xD_k$+i][$yD_m$] means the bS value which is the boundary filtering strength of the horizontal edge and which is defined with respect to ($xD_k$+i, $yD_m$).

(5-6) The value of bStrength[1][k][m] is set as the value of bSVer.

(5-7) The bS decision process is performed on a luma block edge on the basis of the luma sample position (xC, yC) of the current CU, the luma sample position (xDk, yDm) of the current block, the information indicating that the deblocking filtering is performed on the vertical edge, and the boundary filtering strength bSHor, and the value of dEdge[1][k][m] indicating which of strong filtering and weak filtering should be applied and the dS of an array with a size of 8×8 are determined as the information on the determination.

(5-8) dSample[1][m][(k<<3)+i] for determining the value of dEdge is set to dS[i]. At this time, the value of i is equal to 0, . . . , 7.

(6) The deblocking filtering is performed on the edges determined to be subjected to the deblocking filtering on the basis of the bS value, the dEdge value, the dSample value, and the like.

In the method of step 2, log2CUSize−3 is used to derive nD indicating the number of deblocking filtering unit blocks in the current block. That is, the deblocking filter may be applied to the vertical edges and the horizontal edges of the current block (current CU) for each 8×8 pixel block by the number of 8×8 pixel blocks.

Subsequently, the bS values of the vertical edges and the bS values of the horizontal edges are compared by 8 pixels and the largest bS value is determined. For example, bSVer which is the bS of a vertical edge is set to Max(bS[0][xD_k][yD_m+i]) and bSHor which is the bS of a horizontal edge is set to Max(bS[0][xD_k][yD_m+i]), where i is equal to 0, . . . , 7. The bS values based on 8 pixels are compared while the value of i from 0 to 7, and the largest bS value may be set as the bS value for the current deblocking filtering unit block. For example, the bS values based on 8 pixels may be compared along the vertical edge and the largest bS value may be set as the bS of the vertical edge of the current deblocking filtering unit block. The bS values based on 8 pixels may be compared along the horizontal edge and the largest bS value may be set as the bS of the horizontal edge of the current deblocking filtering unit block.

Accordingly, in step 1, the bS is determined for each boundary of all 4×4 pixel blocks (bS setting unit block). However, in step 2, since bSVer as the bS of the horizontal edge and bSHor as the bS of the horizontal edge are set in the boundary of each 8×8 pixel block (deblocking filtering unit block), the bS values determined in the boundaries of the 8×8 pixel block are used.

In step 1 of FIGS. 7 and 8, in order to clearly describe that the process is performed by 4 pixels, expressions such as ((1<<log2CUSize)>>2) and $xE_{k+1}=xE_k+4$, $yE_{j+1}=yE_j+4$ are used, but the present invention is not limited to these expressions. For example, when the bS value can be determined by predetermined bS setting unit blocks (for example, 4×4 pixel blocks in the above-mentioned example), other expressions indicating this case may be used to set the bS value for each bS setting unit block.

In step 2 of FIGS. 7 and 8, in order to clearly describe that the process is performed by 8 pixels, expressions such as log2CUSize−3 are used, but the present invention is not limited to these expressions. For example, when the deblocking filtering is performed by predetermined deblocking filtering unit blocks (for example, 8×8 pixel blocks in the above-mentioned example) and the bS values are set, other expressions indicating this case may be used to reset the bS value for each deblocking filtering unit block.

FIGS. 7 and 8 illustrate the example where luma samples are processed and the current block is a CU, but the present invention is not limited to this example and may be applied to an example where chroma samples are processed and the current block is a process unit (for example, a PU or a TU) other than the CU. Here, the same may be applied to an example where the bS setting unit block is a 4×4 pixel block and the deblocking filtering unit block is not an 8×8 pixel block.

On the other hand, in the examples of FIGS. 7 and 8, in step 1, the bS value is determined and set for boundaries of every 4×4 pixel blocks. However, in step 2, bSVer and bSHor are calculated in the boundaries of an 8×8 pixel block. Accordingly, in the examples of FIGS. 7 and 8, it is not necessary to determine the bS values of the internal edges of the 8×8 pixel block.

Therefore, a method of deriving the bS of only a boundary which is the boundary of the deblocking filtering unit block and the boundary of the bS setting unit block may be considered to reduce complexity of the deblocking filtering process. For example, a method (bS deriving method 1) of determining the bS for each bS setting unit block in each deblocking filtering unit block and a method (bS deriving method 2) of determining the bS for each bS setting unit block and adding a condition that the corresponding boundary of bS setting unit block is located on the boundary of the deblocking filtering unit block may be considered.

First, an example of the method of determining the bS for each bS setting unit block in each deblocking filtering unit block will be described below.

<bS Deriving Method 1>

It is assumed that the position of a luma sample located at the top-left corner of a current block, for example, a current CU, is specified as (xC, yC) with respect to the luma sample located at the top-left corner of a current picture. It is assumed that a parameter for specifying the size of a CU as the current block is log2CUSize and the horizontal edges and the vertical edges of which the bS is determined are indicated by two-dimensional arrays horEdgeFlags and verEdgeFlags. At this time, the size of the two-dimensional arrays is nS×nS and nS=1<<log2CUSize.

It is assumed that $(xE_k, yE_j)$ specifies a set of positions of edge-neighboring samples (edge samples). Here, k=0, . . . , nE−1, j=0, . . . , nE−1, nE is set to ((1<<log2CUSize)>>3), and relationships of $xE_0=0$, $yE_0=0$, $xE_{k+1}=xE_k+8$, and $yE_{j+1}=yE_j+8$ are established.

In this case, samples on which the deblocking filtering is performed in the horizontal edges and the vertical edges may be determined on the basis of $(xE_k, yE_j)$ specifying the set of edge sample positions. For example, in a horizontal edge, (1) when the information indicating a horizontal edge indicates that the deblocking filtering will be performed on the edge (the bS of the edge will be determined) (for example, horEdgeFlags[$xE_k$][$yE_j$]=1), (2) in ($xE_{k+r}$, $yE_j$) (where r=0, 1), $p_0$ may be set to (xC+$xE_k$, yC+$yE_j$−1) of a picture reconstructed by prediction and $q_0$ may be set to (xC+$xE_k$, yC+$yE_j$) of a picture reconstructed by prediction. (3) At this time, the deblocking filtering direction is the vertical direction.

In a vertical edge, (1) when the information indicating a vertical edge indicates that the deblocking filtering will be performed on the edge (the bS of the edge will be determined) (for example, verEdgeFlags[$xE_k$][$yE_j$]=1), (2) in ($xE_k$, $yE_{j+r}$) (where r=0, 1), $p_0$ may be set to (xC+$xE_k$−1, yC+$yE_j$) of a picture reconstructed by prediction and $q_0$ may be set to (xC+$xE_k$, yC+$yE_j$) of a picture reconstructed by prediction. (3) At this time, the deblocking filtering direction is the horizontal direction.

The bS value may be determined with respect to ($E_k$, $E_j$) depending on the filtering direction. For example, the bS may be determined to be bS[filterDir][$E_k$][$E_j$].

According to bS deriving method 1, edges of which the bS will be determined are set for each deblocking filtering unit block. Accordingly, the bS of an edge which is the boundary of the deblocking filtering unit block and the boundary of the bS setting unit block is determined. In bS deriving method 1, since the deblocking filtering unit block is an 8×8 pixel block and the bS is determined by 4 pixels, the edge of which the bS will be determined in the boundary of the 8×8 pixel block is set. For this purpose, expressions such as nE=((1<<log2CUSize)>>3), $xE_{k+1}=xE_k+8$, and $yE_{j+1}=yE_j+8$ are used. The bS value of the horizontal edge is set with respect to ($xE_{k+r}$, yEj) and deblocking filtering samples are specified. The bS value of the vertical edge is set with respect to (Ek, $yE_{j+r}$) and deblocking filtering samples are specified. Here, the value of r is defined as 0 and 1.

Thereafter, when the bS value is set for each 4×4 pixel block, the bS values of the edges which are the overlapped boundaries of the boundaries of the 8×8 pixel blocks and the boundaries of the 4×4 pixel blocks are determined. In other words, the bS value is determined in the unit of 4 pixels (i.e. in the unit of bS setting unit block) on the boundaries of the 8×8 pixel block (i.e. deblocking filtering unit block).

An example of the method of determining the bS for each bS setting unit block and adding a condition that the corresponding bS setting unit block is located on the boundary of the deblocking filtering unit block will be described below.

<bS Deriving Method 2>

It is assumed that the position of a luma sample located at the top-left corner of a current block, for example, a current CU, is specified as (xC, yC) with respect to the luma sample located at the top-left corner of a current picture. It is assumed that a parameter for specifying the size of a CU as the current block is log2CUSize and the horizontal edges and the vertical edges of which the bS is determined are indicated by two-dimensional arrays horEdgeFlags and verEdgeFlags. At this time, the size of the two-dimensional arrays is nS×nS and nS=1<<log2CUSize.

It is assumed that ($xE_k$, $yE_j$) specifies a set of positions of edge-neighboring samples (edge samples). Here, k=0, . . . , nE−1, j=0, . . . , nE−1, nE is set to ((1<<log2CUSize)>>2), and relationships of $xE_0$=0, $yE_0$=0, $xE_{k+1}=xE_k+4$, and $yE_{j+1}=yE_j+4$ are established.

In this case, samples on which the deblocking filtering is performed in the horizontal edges and the vertical edges may be determined on the basis of ($xE_k$, $yE_j$) specifying the set of edge sample positions. For example, in a horizontal edge, (1) when the information indicating a horizontal edge indicates that the deblocking filtering will be performed on the edge (the bS of the edge will be determined) (for example, horEdgeFlags[$xE_k$][$yE_j$]=1) and the value of $yE_j$%2 is 0, (2) $p_0$ may be set to (xC+$xE_k$, yC+$yE_j$−1) of a picture reconstructed by prediction and $q_0$ may be set to (xC+$xE_k$, yC+$yE_j$) of a picture reconstructed by prediction. (3) At this time, the deblocking filtering direction is the vertical direction. Here, $yE_j$%2 means the remainder obtained by dividing $yE_j$ by 2.

In a vertical edge, (1) when the information indicating a vertical edge indicates that the deblocking filtering will be performed on the edge (the bS of the edge will be determined) (for example, verEdgeFlags[$xE_k$][$yE_j$]=1) and the value of $xE_j$%2 is 0, (2) $p_0$ may be set to (xC+$xE_k$−1, yC+$yE_j$) of a picture reconstructed by prediction and $q_0$ may be set to (xC+$xE_k$, yC+$yE_j$) of a picture reconstructed by prediction. (3) At this time, the deblocking filtering direction is the horizontal direction. Here, $xE_j$%2 means the remainder obtained by dividing $xE_j$ by 2.

The bS value may be determined with respect to ($E_k$, $E_j$) depending on the filtering direction. For example, the bS may be determined to be bS[filterDir][$E_k$][$E_j$].

Similarly to bS deriving method 1, in bS deriving method 2, the bS values of the edges located inside the deblocking filtering unit block (8×8 pixel block) are not determined. In bS deriving method 2, the bS setting process is performed for each 4×4 pixel block (bS setting unit block), and the bS value is determined only when the index of a 4×4 pixel block is even, that is, only when the boundary of a 4×4 pixel block is the boundary of an 8×8 pixel block Here, the bS value of each boundary may be set using the bS decision method described in the example of FIG. 5, or may be set using a simpler bS decision method as will be described later.

Figure 9:
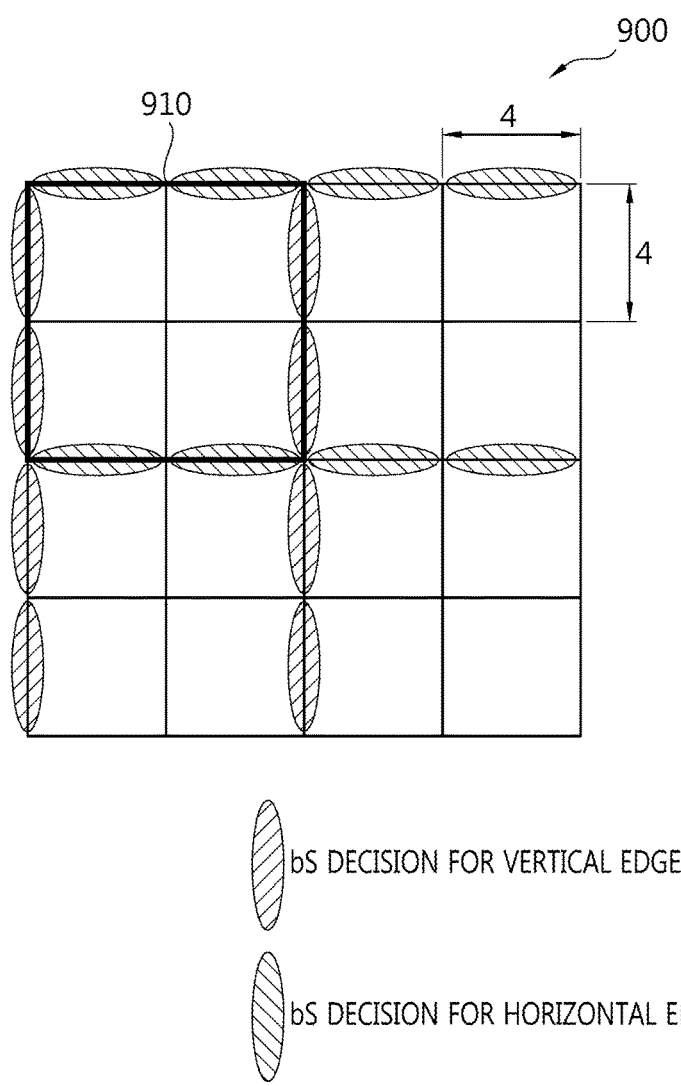
FIG. 9 is a diagram schematically illustrating an example of a bS decision method when a boundary of a deblocking filtering unit block and a boundary of a bS setting unit block match.

FIG. 9 is a diagram schematically illustrating an example of a method of setting a bS when the boundary of a deblocking filtering unit block is matched with the boundary of the bS setting unit block. The example illustrated in FIG. 9 schematically shows the application results of bS deriving method 1 and bS deriving method 2.

As illustrated in FIG. 9, when a deblocking filtering unit block 910 which is an 8×8 pixel block in a current block (for example, a CU) is considered, the bS values of edges located inside the block 910 are not determined.

On the other hand, a method of deriving the bS value of only one edge out of edges of the deblocking filtering unit block and setting the derived bS value as a representative bS value of the corresponding edge out of the edges of the deblocking filtering unit block may be considered in order to simplify the bS setting procedure to reduce complexity and to enhance the effect of deblocking filtering.

Figure 10:
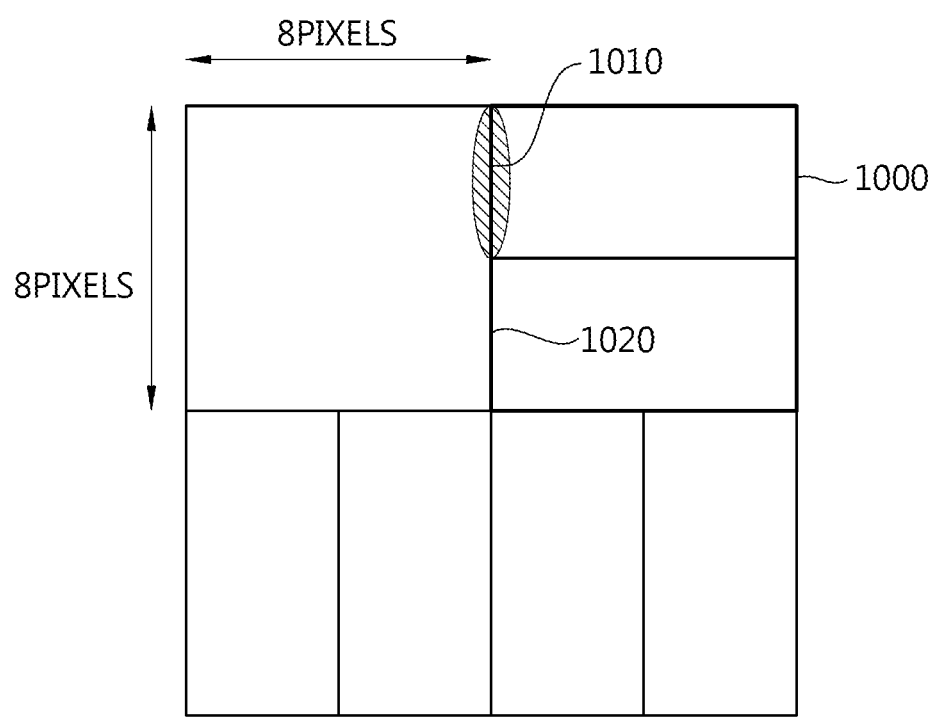
FIG. 10 is a diagram schematically illustrating an example of a method of determining a representative bS value in a unit block on which deblocking filtering is performed.

FIG. 10 is a diagram schematically illustrating an example of a method of determining a representative bS value of a deblocking filtering unit block. FIG. 10 illustrates an example where a deblocking filtering unit block 1000 is an 8×8 pixel block and a bS setting unit block is a 4×4 pixel block.

Referring to FIG. 10, the bS value of only the zeroth edge 1010 out of two vertical edges 1010 and 1020 of which the bS value should be determined in the deblocking filtering unit block 1000 is determined. In other words, the bS values of only the vertical edge and the horizontal edge of the zeroth bS setting unit block are determined for each deblocking filtering unit block, and the calculated bS values are used as the representative bS value of the corresponding deblocking filtering unit block. For example, when the deblocking filtering unit block is an 8×8 pixel block and the bS setting unit block is a 4×4 pixel block, four bS setting unit blocks are present in the deblocking filtering unit block. The bS values of only the vertical edge and the horizontal edge of the zeroth block (top-left block) may be determined and may be used as the representative bS value of the deblocking filtering unit block.

When the bS values are determined as shown in FIG. 8, the bS decision process may be simplified, the bS values may be determined through a process corresponding to ¼ of the existing process, and the memory capacity for storing the bS values may be reduced by ¼.

The position (edge) at which the bS is determined may be determined using any one of the methods described above with reference to FIGS. 6 to 10. The method of specifically determining the bS at the position at which the bS is set is the same as described with reference to FIG. 5.

However, a method simpler than the method illustrated in FIG. 5 may be used as the bS decision method. For example, even when the bS value is finely divided into from 0 to 4 as in the example illustrated in FIG. 5, the deblocking filtering process may not use the divided bS values. For example, it may be determined only whether bS>0 is satisfied, only whether bS>1 is satisfied, or only whether bS>2 is satisfied.

Therefore, the bS decision tree shown in FIG. 5 may be further simplified to perform the deblocking filtering.

Figure 11:
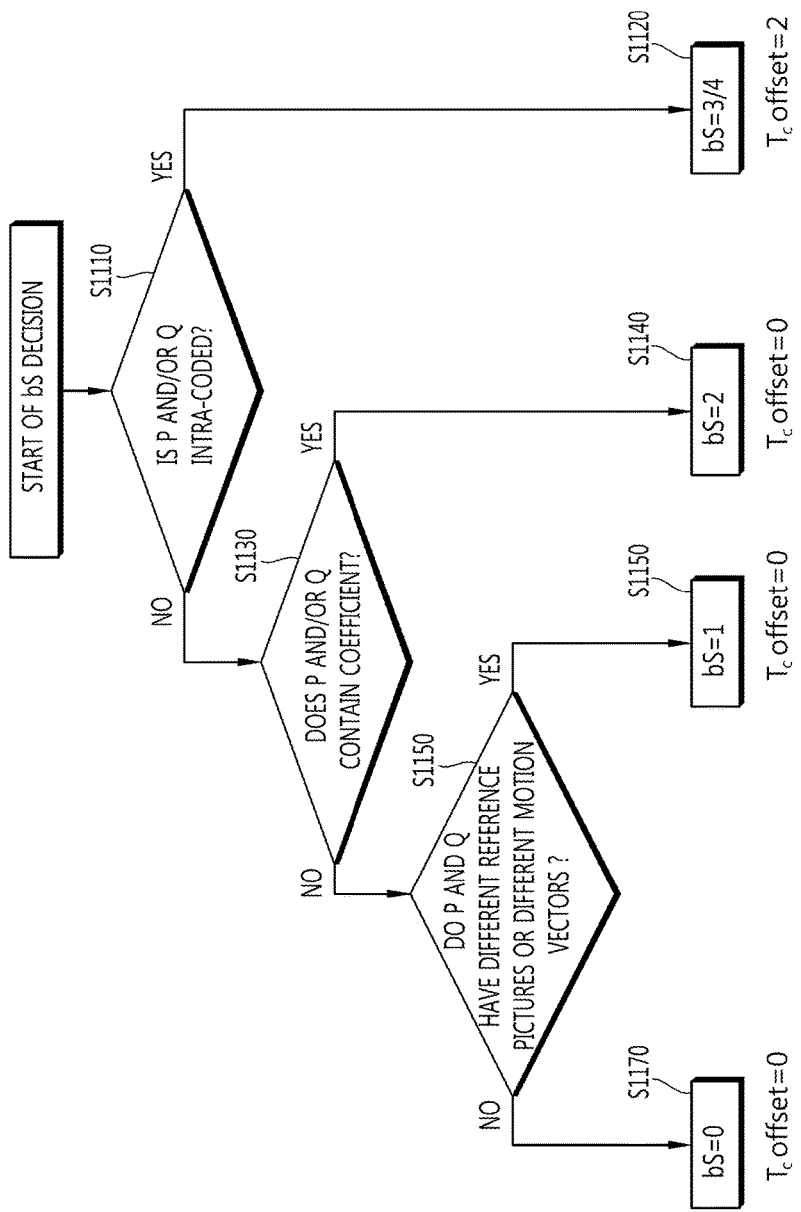
FIG. 11 is a flowchart illustrating schematically illustrating another example of the bS decision method.

FIG. 11 is a flowchart schematically illustrating another example of the bS decision method.

Referring to FIG. 11, it is determined whether block P and/or block Q is intra-coded (S1110).

When it is determined that block P and/or block Q is intra-coded, the bS of the boundary between block P and block Q is determined to be bS3 (S1120).

When it is not the case that block P and/or block Q is intra-coded (i.e. it is a case that none of P and Q is intra-coded), it is determined whether block P and/or block Q includes a coefficient (transform coefficient other than 0) (S1130). At this time, the transform coefficient may be a transform coefficient which has not been dequantized or may be a transform coefficient which has been dequantized.

When it is determined in step S1130 that block P and/or block Q includes a coefficient (transform coefficient other than 0), the bS value of the boundary between block P and block Q is determined to be bS2 (S1140).

When it is determined in step S1130 that block P and/or block Q does not include a coefficient (transform coefficient other than 0), it is determined whether block P and block Q have different reference pictures or block P and block Q have different motion vectors (S1150).

When it is determined in step S1150 that block P and block Q have different reference pictures or block P and block Q have different motion vectors, the bS value of the boundary between block P and block Q is determined to be bS1 (S1160).

Otherwise, that is, when the deblocking filtering should not be performed, the bS value of the boundary between block P and block Q is set to bS0 (S1170).

Here, the bS values determined in steps S1120, S1140, S1160, and S1170 are denoted by bS3, bS2, bS1, and bS0, respectively, which are intended for the purpose of convenience for explanation. When it is considered that the bS values are classified into four types in the example shown in FIG. 11, the values bS0 to bS3 may be set to bS0=0, bS1=1, bS2=2, and bS3=¾ as illustrated in FIG. 11. In the example illustrated in FIG. 11, bS3 is determined to be ¾ in step S1120, which is intended to easily understand that the bS values of 3 and 4 in the example illustrated in FIG. 5 are determined to be a single value (for example, 3) of bS3 in the example illustrated in FIG. 11.

The values of parameters necessary for the deblocking filtering may be set using the bS decision tree. FIG. 11 illustrates an example where $T_C$_offset is set to a specific value (for example, 2) for the largest bS value and is set to 0 for the other bS values.

A method capable of further reducing the number of decision branches than described in the example of FIG. 11 may be considered. In this case, the number of bS values may be reduced to three (bS0, bS1, and bS2) instead of four (bS0, bS1, bS2, and bS3) to perform the deblocking filtering.

In this case, the bS value is determined to be the largest bS value bS2 when block P and/or block Q is intra-coded, the base value is determined to be bS1 when the deblocking filtering may be applied, and the bS value is determined to be bS0 when the deblocking filtering may not be applied. In consideration of derivation to one of three bS values, the values of bS0, bS1, and bS2 may be set, for example, to bS0=0, bS1=1, and bS2=2.

Figure 12:
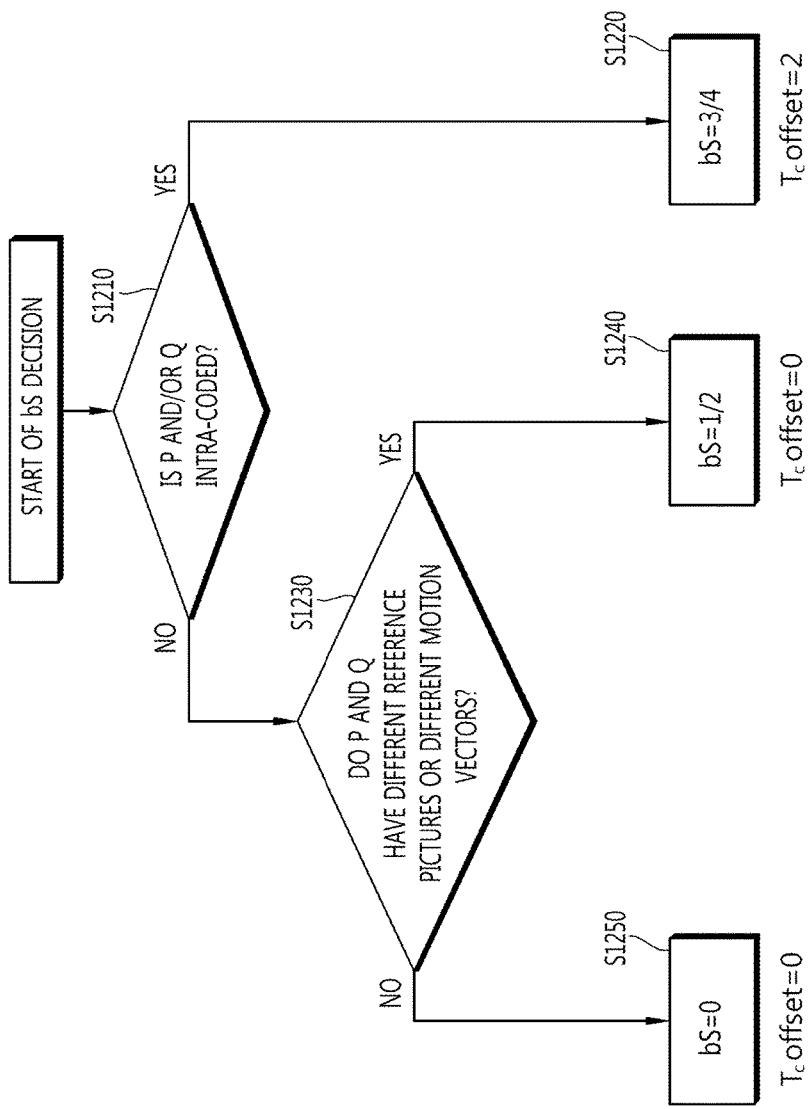
FIGS. 12 to 14 are flowcharts schematically illustrating examples of a method of determining a bS value to be one of three values.

FIG. 12 is a flowchart schematically illustrating the method of setting the bS value to any one of three values as described above.

Referring to FIG. 12, it is determined whether block P and/or block Q is intra-coded (S1210).

When it is determined that block P and/or block Q is intra-coded, the bS of the boundary between block P and block Q is determined to be bS2 (S1220). Here, bS2 corresponds to the case where the bS value is 3 and 4 (bS=¾) in the example of FIG. 5. Since the largest value of three bS values is bS2, the value bS2 may be set to, for example, 2.

When it is not the case that block P and/or block Q is intra-coded (i.e. it is a case that none of P and Q is intra-coded), it is determined whether block P and block Q include a coefficient (transform coefficient) other than 0, whether P and Q have different reference pictures, or whether P and Q have different motion vectors (S1230). At this time, the transform coefficient may be a transform coefficient which has not been dequantized or may be a transform coefficient which has been dequantized.

When it is determined in step S1230 that block P and block Q include a coefficient (transform coefficient) other than 0, block P and block Q have different reference pictures, or block P and block Q have different motion vectors, the bS of the boundary between P and Q is set to bS1 (S1240). The value of bS1 is the bS value when none of block P and block Q is intra-coded and the deblocking filter is applied, and this case corresponds to the case where the bS value is 1 and 2 (bS=½) in the example illustrated in FIG. 5. Since the middle value of three bS values is bS1, the value of bS1 may be set to, for example, 1.

Otherwise, that is, when the deblocking filtering should not be performed, the bS value is set to bS0 (S1240). The value of bS0 is the bS value when the deblocking filter is not applied, and corresponds to the case where the bS value is 0 (bS=0) in the example illustrated in FIG. 5. Since the smallest value of three bS values is bS0, the value of bS0 may be set to, for example, 0.

The values of parameters necessary for the deblocking filtering may be set using the bS decision tree. FIG. 12 illustrates an example where TC_offset is set to a specific value (for example, 2) for the largest bS value and is set to 0 for the other bS values.

Figure 13:
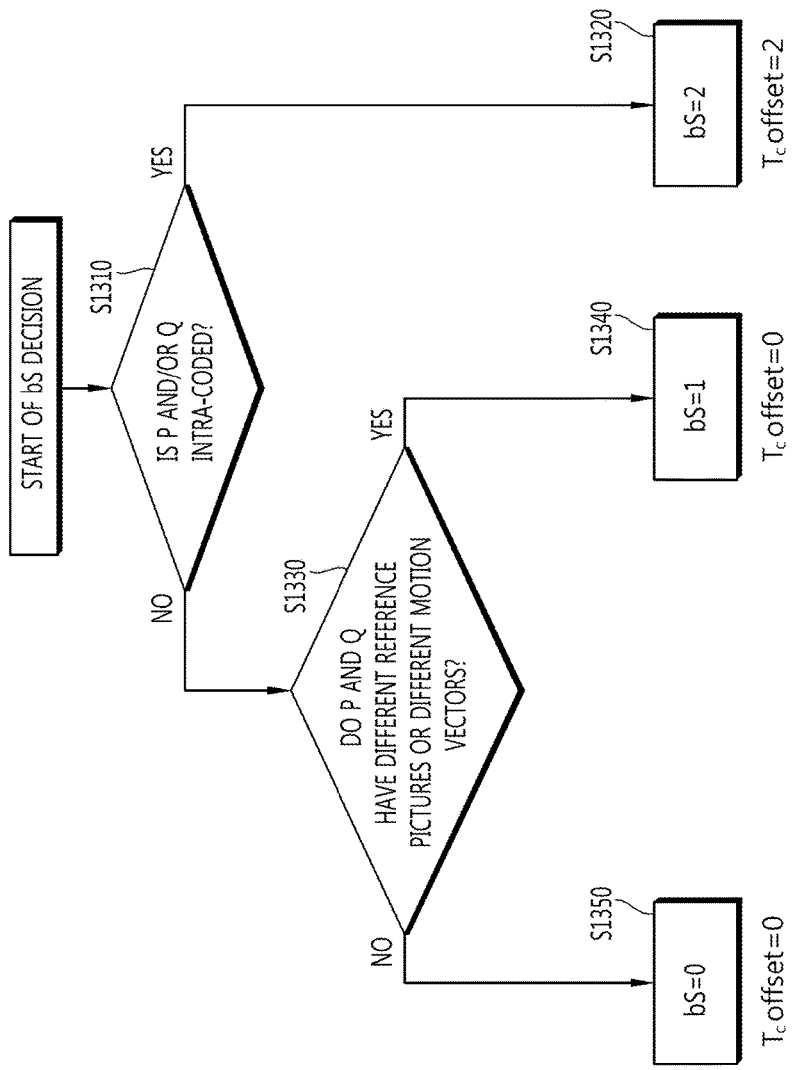

FIG. 13 is a flowchart schematically illustrating another example of the method of determining a bS value to be one of three values. In the bS decision method (bS decision tree) described with reference to FIG. 12, three bS values (bS1, bS2, and bS3) are apparently set to 0, 1, and 2, respectively, for the purpose of easy understanding of the invention.

Referring to FIG. 13, it is determined whether block P and/or block Q is intra-coded (S1310).

When it is determined that block P and/or block Q is intra-coded, the bS value of the boundary between block P and block Q is determined to be 2 (S1320). When the bS value is 2, this case corresponds to the case where the bS value is 3 and 4 (bS=¾) in the example of FIG. 5.

When it is not the case that block P and/or block Q is intra-coded (i.e. it is a case that none of P and Q is intra-coded), it is determined whether block P and block Q include a coefficient (transform coefficient) other than 0, whether P and Q have different reference pictures, or whether P and Q have different motion vectors (S1330). At this time, the transform coefficient may be a transform coefficient which has not been dequantized or may be a transform coefficient which has been dequantized.

When it is determined in step S1330 that block P and block Q include a coefficient (transform coefficient) other than 0, block P and block Q have different reference pictures, or block P and block Q have different motion vectors, the bS value of the boundary between P and Q is set to 1 (S1340).

Here, the bS value of 1 is the bS value when none of block P and block Q is intra-coded and the deblocking filter is applied, and this case corresponds to the case where the bS value is 1 and 2 (bS=½) in the example illustrated in FIG. 5.

Otherwise, that is, when the deblocking filtering should not be performed, the bS value is set to 0 (S1340). The bS value of 0 is the bS value when the deblocking filter is not applied, and this case corresponds to the case where the bS value is 0 (bS=0) in the example illustrated in FIG. 5.

The values of parameters necessary for the deblocking filtering may be set using the bS decision tree. FIG. 13 illustrates the example where TC_offset is set to a specific value (for example, 2) for the largest bS value and is set to 0 for the other bS values.

Even when the bS value is set to any one of three bS values as illustrated in FIGS. 12 and 13, the determination step using a decision tree does not need to be limited to two steps. The five bS values used in the determination method illustrated in FIG. 5 may be further reduced even using more determination steps or less determination steps. For example, the determination, which is performed in one step in FIGS. 12 and 13, on whether block P and block Q include a coefficient (transform coefficient) other than 0, block P and block Q have different reference pictures, or block P and block Q have different motion vectors may be performed in plural steps.

Figure 14:
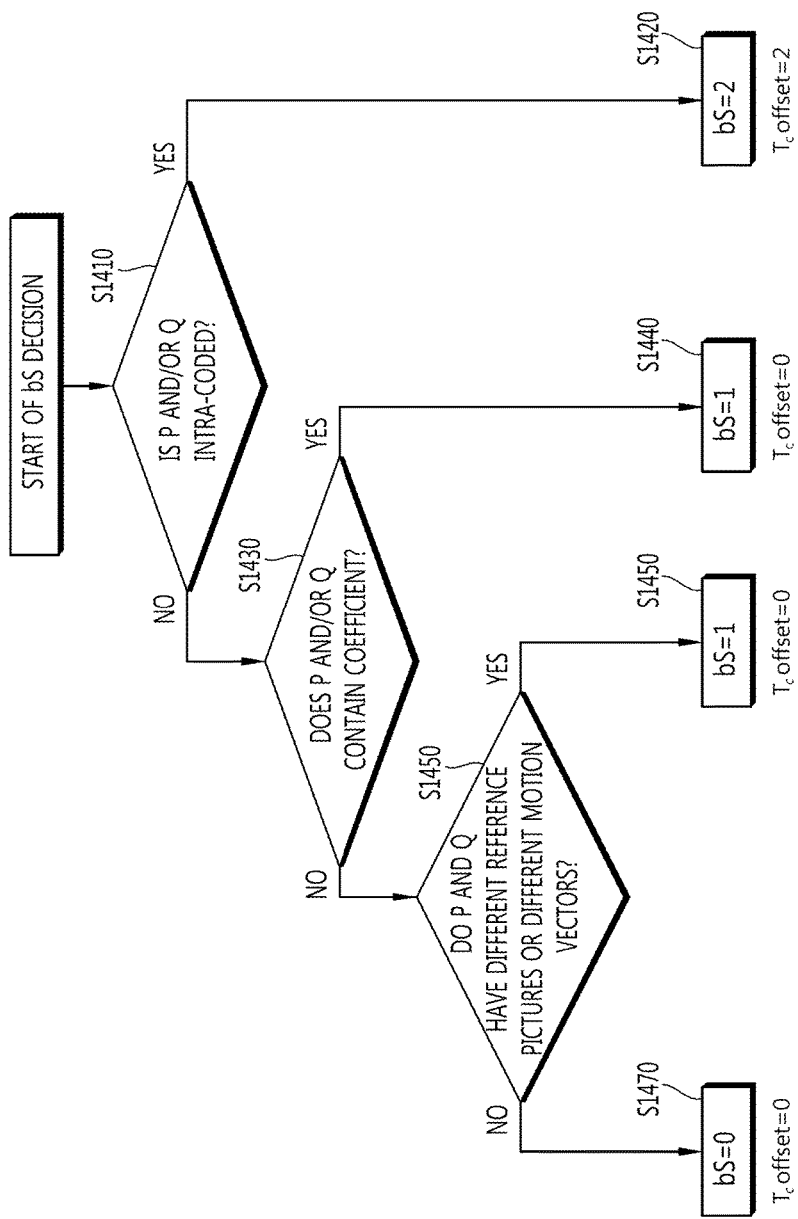

FIG. 14 is a flowchart schematically illustrating still another example of the method of determining a bS value to be one of three values.

Referring to FIG. 14, it is determined whether block P and/or block Q is intra-coded (S1410).

When it is determined that block P and/or block Q is intra-coded, the bS value of the boundary between block P and block Q is determined to be 2 (S1420). When the bS value is 2, this case corresponds to the case where the bS value is 3 and 4 (bS=¾) in the example of FIG. 5.

When it is not the case that block P and/or block Q is intra-coded (i.e. it is a case that none of P and Q is intra-coded), it is determined whether block P and block Q include a coefficient (transform coefficient) other than 0, whether P and Q have different reference pictures, or whether P and Q have different motion vectors (S1430). At this time, the transform coefficient may be a transform coefficient which has not been dequantized or may be a transform coefficient which has been dequantized.

When it is determined that block P and block Q include a coefficient (transform coefficient) other than 0, the bS value of the boundary between P and Q is set to 1 (S1440). Here, the bS value of 1 is the bS value when none of block P and block Q is intra-coded and the deblocking filter is applied, and this case corresponds to the case where the bS value is 2 in the example illustrated in FIG. 5.

When it is determined that block P and block Q do not include a coefficient (transform coefficient) other than 0, it is determined whether block P and block Q have different reference pictures or block P and block Q have different motion vectors (S1450).

When it is determined in step S1450 that block P and block Q have different reference pictures or block P and block Q have different motion vectors, the bS value of boundary between block P and block Q is set to 1 (S1460). Here, the bS value of 1 is the bS value when none of block P and block Q is intra-coded and the deblocking filter is applied, and this case corresponds to the case where the bS value is 1 in the example illustrated in FIG. 5.

Otherwise, that is, when the deblocking filtering is not performed, the bS value is set to 0 (S1470). The bS value of 0 is the bS value when the deblocking filter is not applied, and this case corresponds to the case where the bS value is 0 (bS=0) in the example illustrated in FIG. 5.

The values of parameters necessary for the deblocking filtering may be set using the bS decision tree. FIG. 13 illustrates the example where TC_offset is set to a specific value (for example, 2) for the largest bS value and is set to 0 for the other bS values.

Now, a method of deriving a bS value when the bS value is derived to any one of three values will be described in detail.

First, for the purpose of easy understanding of the present invention, a method of deriving the bS value to any one of five values as illustrated in FIG. 5 or 11 will be described below.

<Method of Deriving bS to any One of Five Values>

First, an edge of which the bS value will be set is specified. The specification of an edge of which the bS will be set may be performed using any one of the methods described above with reference to FIGS. 6 to 10.

As described above with reference to FIGS. 6 to 10, a reference position ($xE_k$, $yE_j$) for setting the bS, right and left samples $p_0$ and $q_0$ of the edge of which the bS value will be set, and the deblocking filtering direction, and the like are derived by the specification of the edge of which the bS value will be set. Samples $p_0$ and $q_0$ are determined on the basis of the reference position ($xE_k$, $yE_j$) as described above.

The parameter $bS[filterDir][xE_k][yE_j]$ indicating the boundary filtering strength is determined depending on the derived deblocking filtering direction. For example, when the value of filterDir is 1, it indicates the filtering in the vertical direction and thus the bS value of the horizontal edge is derived. When the value of filterDir is 0, it indicates the filtering in the horizontal direction and thus the bS value of the vertical edge is derived. $xE_k$ and $yE_j$ specify the edge of which the bS value will be set. For example, the edge of which the bS value will be set in the horizontal edge may be specified to be the boundary between $p_0$ set to ($xC+xE_k$, $yC+yE_j-1$) and $q_0$ set to ($xC+xE_k$, $yC+yE_j$), and the edge of which the bS value will be set in the horizontal edge may be specified to be the boundary between a sample $p_0$ set to ($xC+xE_k-1$, $yC+yE_j$) and a sample $q_0$ set to ($xC+xE_k$, $yC+yE_j$).

The value of $bS[filterDir][xE_k][yE_j]$ may be derived as follows.

(1) When a block edge of which the bS value will be set is a CU edge and a sample $p_0$ or $q_0$ belongs to a CU coded in an intra prediction mode, the bS value, that is, the value of $bS[filterDir][xE_k][yE_j]$, is set to 4.

(2) When a sample $p_0$ or $q_0$ belongs to a CU coded in an inra prediction mode but the block edge of which the bS value will be set is not a CU edge, the value of $bS[filterDir][xE_k][yE_j]$ is set to 3.

(3) When the block edge of which the bS value will be set is a TU edge and the sample $p_0$ or $q_0$ belongs to a TU including a transform coefficient level other than 0, the value of $bS[filterDir][xE_k][yE_j]$ is set to 2.

(4) For other case in which the deblocking filtering is performed, the value of $bS[filterDir][xE_k][yE_j]$ is set to 1. For example, for the purpose of convenience of explanation, FIGS. 5, 11, 12, 13, and 14 illustrate a case in which block P and/or block Q includes a transform coefficient other than 0 and a case in which block P and block Q have different motion vectors or different reference pictures as examples of the case in which the sample $p_0$ or $q_0$ does not belong to a block intra-coded but the deblocking filtering is performed, but the bS other than 0 may be set in various other cases. For example, (i) in a case in which block P and block Q have different numbers of motion vectors and (ii) in a case in which the absolute differences in vertical component or the absolute differences in horizontal component between the motion vectors used for block P and the motion vectors used for block Q are equal to or greater than 4 in the unit of ¼ pixels, the value of bS[filterDir][xE$_k$][yE$_j$] may be set to 1.

(5) In a case other than the cases (1) to (4), that is, in a case in which the deblocking filtering is not performed, the value of bS[filterDir][xE$_k$][yE$_j$] is set to 0.

On the other hand, unlike the method of deriving the bS value to any one of five values, the bS value may be simply derived with lower complexity by deriving the bS value to to any one of three values as illustrated in FIGS. 12 to 14.

An example of the method of deriving the bS value to any one of three values will be described below.

<Method 1 of Deriving bS to any One of Three Values>

First, an edge of which the bS value will be set is specified. The specification of an edge of which the bS will be set may be performed using any one of the methods described above with reference to FIGS. 6 to 10.

A reference position (xE$_k$, yE$_j$) for setting the bS, right and left samples p$_0$ and q$_0$ of the edge of which the bS value will be set, and the deblocking filtering direction, and the like are derived by the specification of the edge of which the bS value will be set.

The parameter bS[filterDir][xE$_k$][yE$_j$] indicating the boundary filtering strength is determined depending on the derived deblocking filtering direction. For example, when the value of filterDir is 1, it indicates the filtering in the vertical direction and thus the bS value of the horizontal edge is derived. When the value of filterDir is 0, it indicates the filtering in the horizontal direction and thus the bS value of the vertical edge is derived. xE$_k$ and yE$_j$ specify the edge of which the bS value will be set. For example, the edge of which the bS value will be set in the horizontal edge may be specified to be the boundary between p$_0$ set to (xC+xE$_k$, yC+yE$_j$−1) and q$_0$ set to (xC+xE$_k$, yC+yE$_j$), and the edge of which the bS value will be set in the horizontal edge may be specified to be the boundary between a sample p$_0$ set to (xC+xE$_k$−1, yC+yE$_j$) and a sample q$_0$ set to (xC+xE$_k$, yC+yE$_j$).

The value of bS[filterDir][xE$_k$][yE$_j$] may be derived as follows.

(1) When a sample p$_0$ or q$_0$ belongs to a CU coded in an intra prediction mode, the bS value, that is, the value of bS[filterDir][xE$_k$][yE$_j$], is set to 2.

(2) When the block edge of which the bS value will be set is a TU edge and the sample p$_0$ or q$_0$ belongs to a TU including a transform coefficient level other than 0, the value of bS[filterDir][xE$_k$][yE$_j$] is set to 1.

(3) For other case in which the deblocking filtering is performed, the value of bS[filterDir][xE$_k$][yE$_j$] is set to 1. For example, as described above with reference to the drawings relevant to the bS decision tree structure, (i) in a case in which a PU including p$_0$ and a PU including q$_0$ have different reference pictures or different numbers of motion vectors, (ii) in a case in which the absolute differences in vertical component or the absolute differences in horizontal component between the motion vectors used for the PU including p$_0$ and the motion vectors used for the PU including q$_0$ are equal to or greater than 4 in the unit of ¼ pixels, (iii) in a case in which when two motion vectors are used for the PU including p$_0$ and two motion vectors are used for the PU including q$_0$, the absolute differences in vertical component or the absolute differences in horizontal component between at least one pair of motion vectors corresponding to the same reference picture is equal to or greater than 4 in the unit of ¼ pixels, and the like, the value of bS[filterDir][xE$_k$][yE$_j$] may be set to 1.

(4) In a case other than the cases (1) to (3), that is, in a case in which the deblocking filtering is not performed, the value of bS[filterDir][xE$_k$][yE$_j$] is set to 0.

On the other hand, instead of deriving the bS value by four steps as described above, the same bS value may be derived in the same step. Another example of the method of deriving the bS value to any one of three bS values will be described below.

<Method 2 of Deriving bS to any One of Three Values>

First, an edge of which the bS value will be set is specified. The specification of an edge of which the bS will be set may be performed using any one of the methods described above with reference to FIGS. 6 to 10.

A reference position (xE$_k$, yE$_j$) for setting the bS, right and left samples p$_0$ and q$_0$ of the edge of which the bS value will be set, and the deblocking filtering direction, and the like are derived by the specification of the edge of which the bS value will be set.

The parameter bS[filterDir][xE$_k$][yE$_j$] indicating the boundary filtering strength is determined depending on the derived deblocking filtering direction. For example, when the value of filterDir is 1, it indicates the filtering in the vertical direction and thus the bS value of the horizontal edge is derived. When the value of filterDir is 0, it indicates the filtering in the horizontal direction and thus the bS value of the vertical edge is derived. xE$_k$ and yE$_j$ specify the edge of which the bS value will be set. For example, the edge of which the bS value will be set in the horizontal edge may be specified to be the boundary between p$_0$ set to (xC+xE$_k$, yC+yE$_j$−1) and q$_0$ set to (xC+xE$_k$, yC+yE$_j$), and the edge of which the bS value will be set in the horizontal edge may be specified to be the boundary between a sample p$_0$ set to (xC+xE$_k$−1, yC+yE$_j$) and a sample q$_0$ set to (xC+xE$_k$, yC+yE$_j$).

The value of bS[filterDir][xE$_k$][yE$_j$] may be derived as follows.

(1) When a sample p$_0$ or q$_0$ belongs to a CU coded in an intra prediction mode, the bS value, that is, the value of bS[filterDir][xE$_k$][yE$_j$], is set to 2.

(2) For other case in which the deblocking filtering is performed, the value of bS[filterDir][xE$_k$][yE$_j$] is set to 1. For example, (i) in a case in which a block edge of which the bS value will be set is a TU edge and the sample p$_0$ or q$_0$ belongs to a TU including a transform coefficient level other than 0, (ii) in a case in which a PU including p$_0$ and a PU including q$_0$ have different reference pictures or different numbers of motion vectors, (iii) in a case in which the absolute differences in vertical component or the absolute differences in horizontal component between the motion vectors used for the PU including p$_0$ and the motion vectors used for the PU including q$_0$ are equal to or greater than 4 in the unit of ¼ pixels, (iv) in a case in which when two motion vectors are used for the PU including p$_0$ and two motion vectors are used for the PU including q$_0$, the absolute differences in vertical component or the absolute differences in horizontal component between at least one pair of motion vectors corresponding to the same reference picture is equal to or greater than 4 in the unit of ¼ pixels, and the like, the value of bS[filterDir][xE$_k$][yE$_j$] may be set to 1.

(3) In a case other than the cases (1) and (2), that is, in a case in which the deblocking filtering is not performed, the value of bS[filterDir][$xE_k$][$yE_j$] is set to 0.

On the other hand, the case in which the bS value is derived to 1 may not be limited to the case in which the block edge of which the bS value will be set is the TU edge. Another example of the method of deriving the bS value to any one of three bS values will be described below.

<Method 3 of Deriving bS to any One of Three Values>

First, an edge of which the bS value will be set is specified. The specification of an edge of which the bS will be set may be performed using any one of the methods described above with reference to FIGS. 6 to 10.

A reference position ($xE_k$, $yE_j$) for setting the bS, right and left samples $p_0$ and $q_0$ of the edge of which the bS value will be set, and the deblocking filtering direction, and the like are derived by the specification of the edge of which the bS value will be set.

The parameter bS[filterDir][$xE_k$][$yE_j$] indicating the boundary filtering strength is determined depending on the derived deblocking filtering direction. For example, when the value of filterDir is 1, it indicates the filtering in the vertical direction and thus the bS value of the horizontal edge is derived. When the value of filterDir is 0, it indicates the filtering in the horizontal direction and thus the bS value of the vertical edge is derived. $xE_k$ and $yE_j$ specify the edge of which the bS value will be set. For example, the edge of which the bS value will be set in the horizontal edge may be specified to be the boundary between $p_0$ set to (xC+$xE_k$, yC+$yE_j$−1) and $q_0$ set to (xC+$xE_k$, yC+$yE_j$), and the edge of which the bS value will be set in the horizontal edge may be specified to be the boundary between a sample $p_0$ set to (xC+$xE_k$−1, yC+$yE_j$) and a sample $q_0$ set to (xC+$xE_k$, yC+$yE_j$).

The value of bS[filterDir][$xE_k$][$yE_j$] may be derived as follows.

(1) When a sample $p_0$ or $q_0$ belongs to a CU coded in an intra prediction mode, the bS value, that is, the value of bS[filterDir][$xE_k$][$yE_j$], is set to 2.

(2) For other case in which the deblocking filtering is performed, the value of bS[filterDir][$xE_k$][$yE_j$] is set to 1. For example, (i) in a case in which a block edge of which the bS value will be set is a TU edge and the sample $p_0$ or $q_0$ belongs to a TU including a transform coefficient level other than 0, (ii) in a case in which a PU including $p_0$ and a PU including $q_0$ have different reference pictures or different numbers of motion vectors, (iii) in a case in which the absolute differences in vertical component or the absolute differences in horizontal component between the motion vectors used for the PU including $p_0$ and the motion vectors used for the PU including $q_0$ are equal to or greater than 4 in the unit of ¼ pixels, (iv) in a case in which when two motion vectors are used for the PU including $p_0$ and two motion vectors are used for the PU including $q_0$, the absolute differences in vertical component or the absolute differences in horizontal component between at least one pair of motion vectors corresponding to the same reference picture is equal to or greater than 4 in the unit of ¼ pixels, and the like, the value of bS[filterDir][$xE_k$][$yE_j$] may be set to 1.

(3) In a case other than the cases (1) and (2), that is, in a case in which the deblocking filtering is not performed, the value of bS[filterDir][$xE_k$][$yE_j$] is set to 0.

In the methods of deriving the bS value to any one of three values, when the PU including $p_0$ and the PU including $q_0$ have different reference pictures, it is determined depending on what picture is referred to regardless of what reference picture list is used and whether the reference picture indices of the reference picture list are identical.

The bS deriving method for luma samples has been described above, but the bS derived as described above may be applied to chroma samples.

As described above, when the number of bS values is decreased to reduce complexity and the bS is more simply derived, it is necessary to correct and perform a deblocking filtering method for chroma components.

An example of a method of deriving the bS value to any one of five values and performing the deblocking filter on the chroma components (chroma samples) using the derived bS value will be described below.

<Method 1 of Performing Deblocking Filtering on Chroma Samples>

A parameter $t_c$ is specified. The parameter $t_c$ is a value for quantizing a blocking artifact corresponding to a degree of quantization and may be derived on the basis of TC_offset or may be mapped in a predetermined table on the basis of other deblocking filtering parameters.

For example, as shown in Table 1, the parameter $t_c$ may be determined depending on a quantization parameter Q, β as a reference value for determining whether the deblocking filtering will be performed, and the like.

As described in the <Method of Deriving bS to Any One of Five Values>, when the bS of an edge of a chroma sample is derived to any value of 0 to 4, the value of $t_c$ may be specified as follows. (1) When the bS value is greater than 2 and the average value of the quantization parameter of block P and block Q in consideration of a round value is $qP_L$, the parameter $t_c$ is determined to be a value corresponding to the quantization parameter Q=Clip(0, 55, $qP_L$). (2) When the bS value is equal to or less than 2, the parameter $t_c$ is determined to be a value corresponding to the quantization parameter Q=$qP_L$.

Table 1 shows an example of relationships among Q, β, and $t_c$.

TABLE 1

| Q | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|----|----|----|----|----|----|----|----|----|
| β | 0 | 0 | 0 | 0 | 0 | 0 | 0 | 0 | 0 | 0 | 0 | 0 | 0 | 0 | 0 | 0 | 6 | 7 | 8 |
| $t_C$ | 0 | 0 | 0 | 0 | 0 | 0 | 0 | 0 | 0 | 0 | 0 | 0 | 0 | 0 | 0 | 0 | 0 | 0 | 1 |

| Q | 19 | 20 | 21 | 22 | 23 | 24 | 25 | 26 | 27 | 28 | 29 | 30 | 31 | 32 | 33 | 34 | 35 | 36 | 37 |
|---|----|----|----|----|----|----|----|----|----|----|----|----|----|----|----|----|----|----|----|
| β | 9 | 10 | 11 | 12 | 13 | 14 | 15 | 16 | 17 | 18 | 20 | 22 | 24 | 26 | 28 | 30 | 32 | 34 | 36 |
| $t_C$ | 1 | 1 | 1 | 1 | 1 | 1 | 1 | 1 | 2 | 2 | 2 | 2 | 3 | 3 | 3 | 3 | 4 | 4 | 4 |

| Q | 38 | 39 | 40 | 41 | 42 | 43 | 44 | 45 | 46 | 47 | 48 | 49 | 50 | 51 | 52 | 53 | 54 | 55 |
|---|----|----|----|----|----|----|----|----|----|----|----|----|----|----|----|----|----|----|
| β | 38 | 40 | 42 | 44 | 46 | 48 | 50 | 52 | 54 | 56 | 58 | 60 | 62 | 64 | 64 | 64 | 64 | 64 |
| $t_C$ | 5 | 5 | 6 | 6 | 7 | 8 | 9 | 9 | 10 | 10 | 11 | 11 | 12 | 12 | 13 | 13 | 14 | 14 |

Here, expressions of $t_C = t_C' * (1<<(BitDepthY-8))$ and $β = β' * (1<<(BitDepthY-8))$ may be established.

The deblocking filtering on the chroma samples may be performed using the parameters specified on the basis of the values of Table 1.

First, the deblocking filtering is performed on the chroma sample positions (xC+xB, yC+yB+k) in the vertical edge. Here, k=0, . . . , 3.

(1) In block P and block Q with the vertical edge as a boundary, a chroma sample $p_i$ of block P and a chroma sample $q_i$ of block Q (where 1) are derived to $q_i$=s'[xC+xB+i, yC+yB+k] and $p_i$=s'[xC+xB−i−1, yC+yB+k].

(2) When the bS value is greater than 2, (i) the filtering procedure is performed on the chroma samples $p_i$ and $q_i$. (ii) The corresponding sample positions of the filtered chroma samples $p_0'$ and $q_0'$ in the sample array are replaced as follows: S'[xC+xB, yC+yB+k]=$q_0'$ and s'[xC+xB, yC+yB+k]=$p_0'$.

The deblocking filtering is performed on the chroma components in the horizontal edge as follows. Here, k= 0, . . . , 3.

(1) In a chroma sample $p_i$ of block P and a chroma sample $q_i$ of block Q (where 1) are derived to $q_i$=s'[xC+xB+i, yC+yB+k] and $p_i$=s'[xC+xB−i−1, yC+yB+k].

(2) When the bS value is greater than 2, (i) the filtering procedure is performed on the chroma samples $p_i$ and $q_i$. (ii) The corresponding sample positions of the filtered chroma samples $p_0'$ and $q_0'$ in the sample array are replaced as follows: S'[xC+xB, yC+yB+k]=$q_0'$ and s'[xC+xB, yC+yB+k]=$p_0'$.

The deblocking filtering is performed on the chroma components in the horizontal edge as follows.

(1) In block P and block Q with the horizontal edge as a boundary, a chroma sample $p_i$ of block P and a chroma sample $q_i$ of block Q (where i=0, 1) are derived to $q_i$=s'[xC+xB+k, yC+yB+i] and $p_i$=s'[xC+xB+k, yC+yB−i−1]. Here, k may have a value of 0, . . . , 3.

(2) When the bS value is greater than 2, (i) the filtering procedure is performed on the chroma samples $p_i$ and $q_i$. (ii) The corresponding sample positions of the filtered chroma samples $p_0'$ and $q_0'$ in the sample array are replaced as follows: S'[xC+xB, yC+yB+k]=$q_0'$ and s'[xC+xB−1, yC+yB+k]=$p_0'$.

In the filtering process, when the bS value is greater than 2, the filtered samples are derived as expressed by Expression 5.

$\Delta = \text{Clip3}(-t_C, t_C, ((((q_0-p_0)<<2)+p_1-q_1+4)>>3))$ $p_0' = \text{Clip1}_C(p_0+\Delta)$ $q_0' = \text{Clip1}_C(q_0-\Delta)$ <Expression 5>

On the other hand, when the number of bS values is decreased to reduce complexity and the bS is more simply derived, the deblocking filtering method for chroma samples may be performed as follows.

<Method 2 of Performing Deblocking Filtering on Aroma Samples>

A parameter $t_c$ is specified. The parameter $t_c$ is a value for quantizing a blocking artifact corresponding to a degree of quantization and may be derived on the basis of $t_c$offset or may be mapped in a predetermined table on the basis of other deblocking filtering parameters.

For example, as shown in Table 2, the parameter $t_c$ may be determined depending on a quantization parameter Q, β as a reference value for determining whether the deblocking filtering will be performed, and the like.

As described in the <Method of Deriving bS to Any One of Three Values>, when the bS of an edge of a chroma sample is derived to any value of 0 to 2, the value of $t_c$ may be specified as follows. (1) When the bS value is greater than 2 and the average value of the quantization parameter of block P and block Q in consideration of a round value is $qP_L$, the parameter $t_c$ is determined to be a value corresponding to the quantization parameter Q=Clip(0, 55, $qP_L$). (2) When the bS value is equal to or less than 2, the parameter $t_c$ is determined to be a value corresponding to the quantization parameter Q=$qP_L$.

Table 2 shows an example of relationships among Q, β, and $t_c$.

TABLE 2

| Q | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|----|----|----|----|----|----|----|----|----|
| β' | 0 | 0 | 0 | 0 | 0 | 0 | 0 | 0 | 0 | 0 | 0 | 0 | 0 | 0 | 0 | 0 | 6 | 7 | 8 |
| $t_C'$ | 0 | 0 | 0 | 0 | 0 | 0 | 0 | 0 | 0 | 0 | 0 | 0 | 0 | 0 | 0 | 0 | 0 | 0 | 1 |

| Q | 19 | 20 | 21 | 22 | 23 | 24 | 25 | 26 | 27 | 28 | 29 | 30 | 31 | 32 | 33 | 34 | 35 | 36 | 37 |
|---|----|----|----|----|----|----|----|----|----|----|----|----|----|----|----|----|----|----|----|
| β' | 9 | 10 | 11 | 12 | 13 | 14 | 15 | 16 | 17 | 18 | 20 | 22 | 24 | 26 | 28 | 30 | 32 | 34 | 36 |
| $t_C'$ | 1 | 1 | 1 | 1 | 1 | 1 | 1 | 1 | 2 | 2 | 2 | 2 | 3 | 3 | 3 | 3 | 4 | 4 | 4 |

| Q | 38 | 39 | 40 | 41 | 42 | 43 | 44 | 45 | 46 | 47 | 48 | 49 | 50 | 51 | 52 | 53 |
|---|----|----|----|----|----|----|----|----|----|----|----|----|----|----|----|----|
| β' | 38 | 40 | 42 | 44 | 46 | 48 | 50 | 52 | 54 | 56 | 58 | 60 | 62 | 64 | — | — |
| $t_C'$ | 5 | 5 | 6 | 6 | 7 | 8 | 9 | 10 | 11 | 13 | 14 | 16 | 18 | 20 | 22 | 24 |

Here, expressions of $t_C=t_C'*(1<<(\text{BitDepthY}-8))$ and $\beta=\beta'*(1<<(\text{BitDepthY}-8))$ may be established.

The deblocking filtering on the chroma samples may be performed using the parameters specified on the basis of the values of Table 2.

First, the deblocking filtering is performed on the chroma sample positions (xC+xB, yC+yB+k) in the vertical edge. Here, k=0, . . . , 3.

(1) In block P and block Q with the vertical edge as a boundary, a chroma sample $p_i$ of block P and a chroma sample $q_i$ of block Q (where 1) are derived to $q_i$=s'[xC+xB+i, yC+yB+k] and $p_i$=s'[xC+xB−i−1, yC+yB+k].

(2) When the bS value is greater than 1, (i) the filtering procedure is performed on the chroma samples $p_i$ and $q_i$. (ii) The corresponding sample positions of the filtered chroma samples $p_0'$ and $q_0'$ in the sample array are replaced as follows: S'[xC+xB, yC+yB+k]=$q_0'$ and s'[xC+xB, yC+yB+k]=$p_0'$.

The deblocking filtering is performed on the chroma components in the horizontal edge as follows. Here, k= 0, . . . , 3.

(1) In a chroma sample $p_i$ of block P and a chroma sample $q_i$ of block Q (where 1) are derived to $q_i$=s'[xC+xB+i, yC+yB+k] and $p_i$=s'[xC+xB−i−1, yC+yB+k].

(2) When the bS value is greater than 1, (i) the filtering procedure is performed on the chroma samples $p_i$ and $q_i$. (ii) The corresponding sample positions of the filtered chroma samples $p_0'$ and $q_0'$ in the sample array are replaced as follows: $S'[xC+xB, yC+yB+k]=q_0'$ and $s'[xC+xB, yC+yB+k]=p_0'$.

The deblocking filtering is performed on the chroma components in the horizontal edge as follows.

(1) In block P and block Q with the horizontal edge as a boundary, a chroma sample $p_i$ of block P and a chroma sample $q_i$ of block Q (where 1) are derived to $q_i=s'[xC+xB+k, yC+yB+i]$ and $p_i=s'[xC+xB+k, yC+yB-i-1]$. Here, k may have a value of 0, . . . , 3.

(2) When the bS value is greater than 1, (i) the filtering procedure is performed on the chroma samples $p_i$ and $q_i$. (ii) The corresponding sample positions of the filtered chroma samples $p_0'$ and $q_0'$ in the sample array are replaced as follows: $S'[xC+xB, yC+yB+k]=q_0'$ and $s'[xC+xB-1, yC+yB+k]=p_0'$.

In the filtering process, when the bS value is greater than 1, the filtered samples are derived as expressed by Expression 6.

$$\Delta = \text{Clip3}(-t_C, t_C, ((((q_0-p_0)<<2)+p_1-q_1+4)>>3))$$

$$p_0' = \text{Clip1}_C(p_0+\Delta)$$

$$q_0' = \text{Clip1}_C(q_0-\Delta)$$ <Expression 6>

On the other hand, block-based motion compensation is one principal reason for blocking artifacts in a block boundary. In order to overcome this problem, OBMC (Overlapped Block Motion Compensation) may be used.

When the OBMC is used, the above-mentioned bS decision process needs to be modified to be suitable for the OBMC. For example, when motion information varies between blocks, blocking artifacts may increase. Accordingly, similarity of motion information may be said to be one reference for determining 0 and 1 as the bS values. However, when the OBMC technique is used, block artifacts at the boundary of an area on which motion compensation is performed are reduced. As a result, unnecessary deblocking filtering may be reduced, but the bS decision process (bS determination tree) needs to be modified in consideration thereof.

Figure 15:
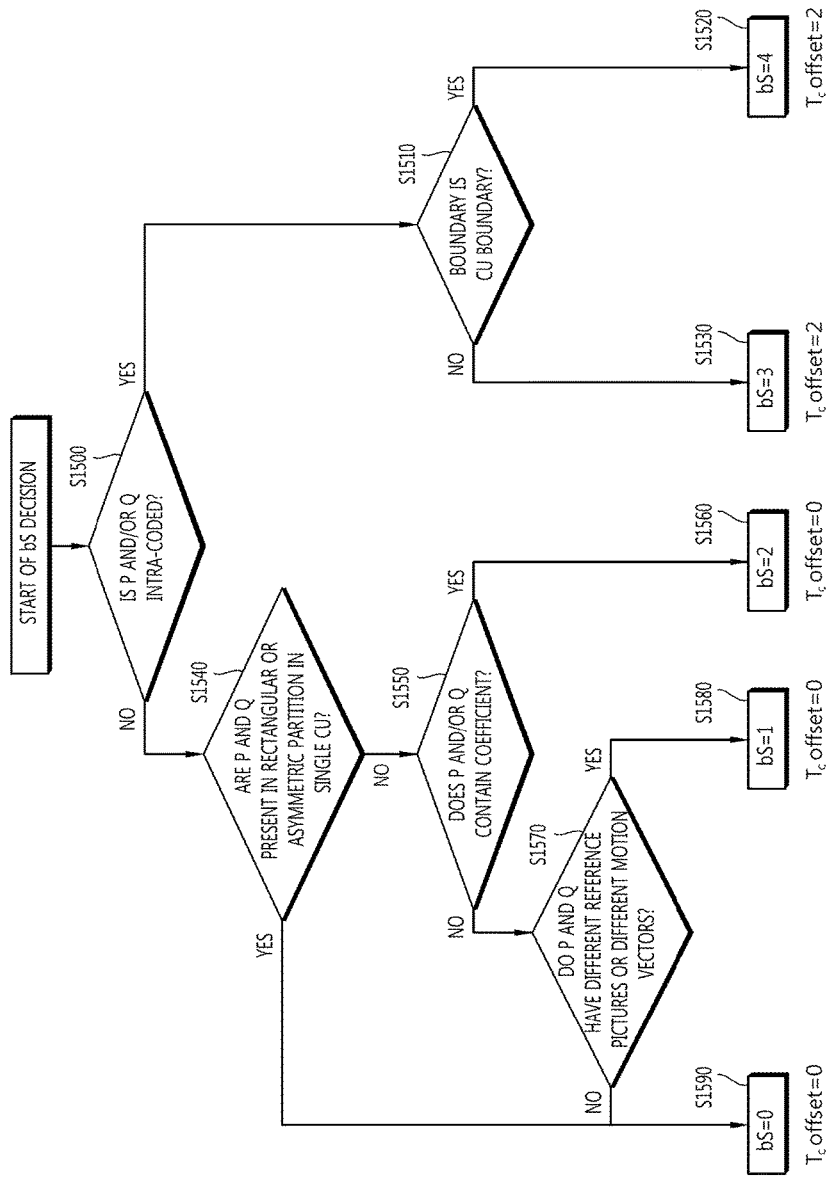
FIGS. 15 and 16 are flowcharts schematically illustrating the bS decision method as an example of a bS decision tree which is used to apply an OMBC.

FIG. 15 is a flowchart schematically illustrating the bS decision method as an example of the bS decision tree which is applied at the time of application of the OBMC.

Referring to FIG. 15, it is first determined whether block P and/or block Q is intra-coded (S1500).

When it is determined that block P and/or block Q is intra-coded, it is determined whether the boundary of block Q, that is, the boundary between block P and block Q, is a boundary of a coding block (S1510). At this time, the coding block includes a CU and an LCU.

When it is determined in step S1510 that the boundary between block P and block Q is a boundary of a coding block, the bS value of the boundary between block P and block Q is determined to be bS4 (for example, bS4=4) (S1520).

When it is determined in step S1520 that the boundary between block P and block Q is not a boundary of a coding block, the bS value of the boundary between block P and block Q is determined to be bS3 (for example, bS3=3) (S1530).

When it is determined in step S1500 that none of block P and block Q is intra-coded, it is determined whether block P and block Q are present inside a rectangular or asymmetric partition in a single coding block (for example CU) (S1540).

When it is determined in step S1540 that block P and block Q are not present inside a rectangular or asymmetric partition in a single coding block (for example CU), it is determined whether P and/or Q include a coefficient (a transform coefficient other than 0) (S1550). At this time, the transform coefficient may be a transform coefficient which has not been dequantized or may be a transform coefficient which has been dequantized.

When it is determined in step S1550 that block P and/or block Q include a coefficient (a transform coefficient other than 0), the bS of the boundary between P and Q is determined to be bS2 (for example, bS2=2) (S1560).

When it is determined in step S1550 that block P and/or block Q do not include a coefficient (a transform coefficient other than 0), it is determined whether block P and block Q have different reference pictures or motion vectors (S1570).

When it is determined in step 1570 that block P and block Q have different reference pictures or different motion vectors, the bS of the boundary between block P and block Q is determined to be bS1 (for example, bS1=1) (S1580).

Otherwise, that is, when the deblocking filtering should not be performed, the bS value is set to bS0 (for example, bS1=1) (S1590). The bS is set to bS0 when it is determined in step S1540 that block P and block Q are not present inside a rectangular or asymmetric partition in a single coding block (for example, CU) or when it is determined in step S1570 that block P and block Q do not have different reference pictures or different motion vectors.

In the example illustrated in FIG. 15, similarly to the above-mentioned examples of the bS decision method, the relationship of bS4>bS3>bS2>bS1>bS0 is maintained. Therefore, the values of bS0 to bS4 may be set to bS4=4, bS3=3, bS2=2, bS1=1, and bS0=0, as described above and illustrated in the drawing.

similarly to the above-mentioned examples, the values of a parameter necessary for the deblocking filtering may be set using the bS decision tree. FIG. 15 illustrates an example where $T_C$offset is set to a specific value (for example, 2) for the largest two bS values and is set to 0 for the other bS values.

In the example illustrated in FIG. 15, when block P and block Q are present in a single coding block (for example, a CU) and are present inside a rectangular partition (for example, a prediction block and a PU) or in an asymmetric partition (for example, a prediction block and a PU), the bS value of the boundary between block P and block Q may be determined to be 0.

Otherwise, when block P and block Q are present in a single coding block (for example, a CU) and are present inside a rectangular partition (for example, a prediction block and a PU) or in an asymmetric partition (for example, a prediction block and a PU) but there is a large difference between motion information of P and motion information of block Q, the bS value of the boundary between block P and block Q may be determined to be 1. When there is a small difference between the motion information of block P and the motion information of block Q, the bS value of the boundary between block P and block Q may be determined to be 0.

Figure 16:
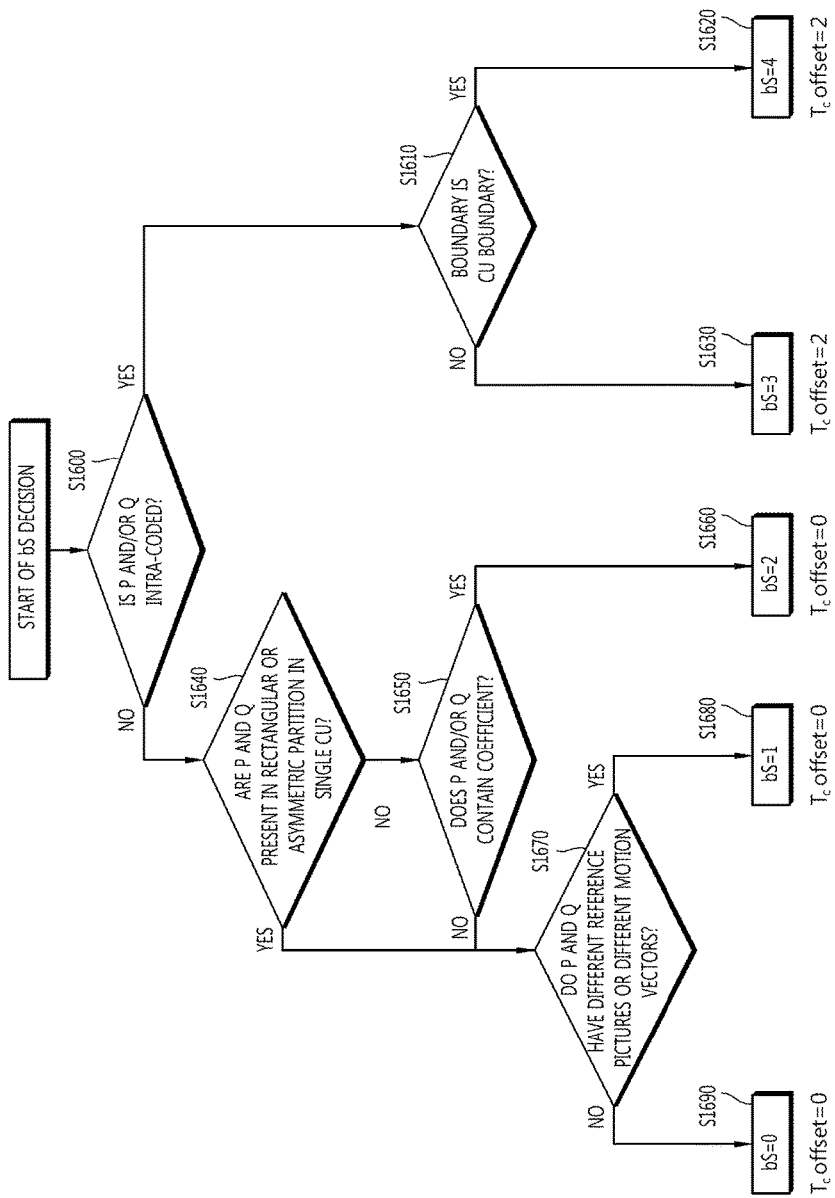

FIG. 16 is a flowchart schematically illustrating the bS decision method as another example of the bS decision tree which is applied at the time of application of the OBMC.

Referring to FIG. 16, it is first determined whether P and/or Q is intra-coded (S1600).

When it is determined that block P and/or block Q is intra-coded, it is determined whether the boundary of block Q, that is, the boundary between block P and block Q is a boundary of a coding block (S1610). At this time, the coding block includes a CU and an LCU.

When it is determined in step S1610 that the boundary between block P and block Q is a boundary of a coding block, the bS value of the boundary between block P and block Q is determined to be bS4 (for example, bS4=4) (S1620).

When it is determined in step S1620 that the boundary between block P and block Q is not a boundary of a coding block, the bS value of the boundary between block P and block Q is determined to be bS3 (for example, bS3=3) (S1630).

When it is determined in step S1600 that none of block P and block Q is intra-coded, it is determined whether block P and block Q are present in a rectangular or asymmetric partition in a single coding block (for example a CU) (S1640).

When it is determined in step S1640 that block P and block Q are not present inside a rectangular or asymmetric partition in a single coding block (for example, CU), it is determined whether block P and/or block Q include a coefficient (transform coefficient other than 0) (S1650). At this time, the transform coefficient may be a transform coefficient which has not been dequantized or may be a transform coefficient which has been dequantized.

When it is determined in step S1650 that block P and/or block Q include a coefficient (a transform coefficient other than 0), the bS value of the boundary between block P and block Q is determined to be bS2 (for example, bS2=2) (S1660).

When it is determined in step S1640 that block P and block Q are present inside a rectangular or asymmetric partition in a single coding block (for example, CU) or when it is determined in step S1650 that block P and/or block Q do not include a coefficient (a transform coefficient other than 0), it is determined whether block P and block Q have different reference pictures or different motion vectors (S1670).

When it is determined in step S1670 that block P and block Q have different reference pictures or different motion vectors, the bS value of the boundary between block P and block Q is determined to be bS1 (for example, bS1=1) (S1680).

Otherwise, that is, when the deblocking filtering should not be performed, the bS value is set to bS0 (for example, bS0=0) (S1690).

In the example illustrated in FIG. 16, similarly to the above-mentioned examples of the bS decision method, the relationship of bS4>bS3>bS2>bS1>bS0 is maintained. Therefore, the values of bS0 to bS4 may be set to bS4=4, bS3=3, bS2=2, bS1=1, and bS0=0, as described above and illustrated in the drawing.

As described above, in the example illustrated in FIG. 16, even when block P and block Q are present in a single coding block (for example, a CU) and are present inside a rectangular partition (for example, a prediction block and a PU) or in an asymmetric partition (for example, a prediction block and a PU), the bS value of the boundary between block P and block Q may be determined to be bS1 (for example, bS1=1).

Similarly to the above-mentioned examples, the values of a parameter necessary for the deblocking filtering may be set using the bS decision tree. FIG. 16 illustrates an example where $T_C$offset is set to a specific value (for example, 2) for the largest two bS values and $t_C$offset is set to 0 for the other bS values.

On the other hand, when block P and/or block Q is intra-coded, the bS values may not have to be divided. For example, as in the example illustrated in FIG. 5, 15, or 16, it is assumed that it is determined whether a target boundary in an I slice (intra-coded slice) is a boundary of a coding block (for example, a CU), the bS value is determined to be 4 when the determination result is affirmative, and the bS value is determined to be 3 when the determination result is negative. In this case, the bS values in all the I slices are 3 or 4.

In this regard, when the method of modifying the bS decision tree to reduce complexity is applied as illustrated in FIGS. 12 to 14, the bS value may be simply applied depending on whether the bS value is larger than 0 or larger than 1 or 2. Therefore, the bS value of 3 or 4 may not have to be distinguished.

Figure 17:
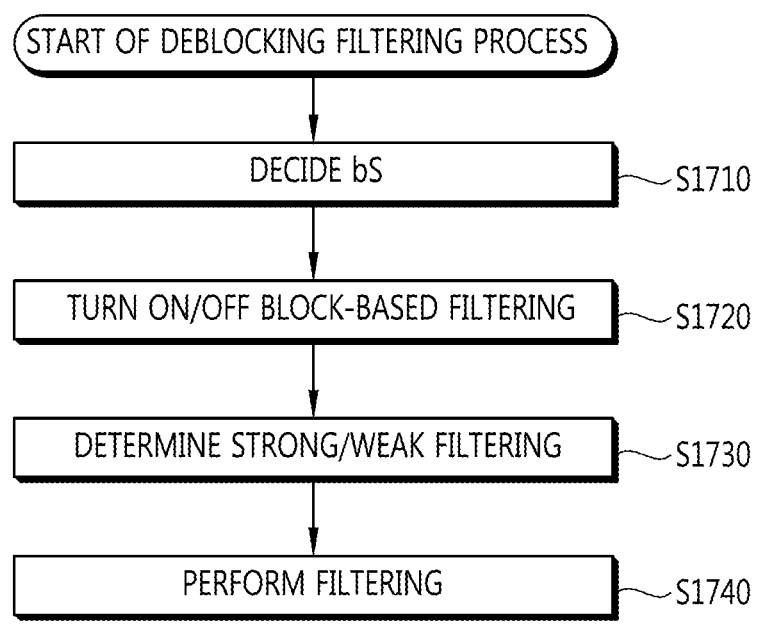
FIGS. 17 and 18 are diagrams schematically illustrating examples of a method of determining a bS and applying deblocking filtering.

FIG. 17 is a diagram schematically illustrating an example of the method of determining a bS value to apply the deblocking filtering.

Referring to FIG. 17, the bS value is determined to apply the deblocking filtering (S1710), ON/OFF of block-based filtering is determined on the basis of the determined bS value (S1720), it is determined whether a strong filter or a weak filter should be applied to a predetermined bS value (S1730), and the filtering operation is then performed on the basis thereof (S1740).

In the example illustrated in FIG. 17, the method of applying the deblocking filter is identical or similar to the method described with reference to FIG. 3.

In the bS decision step (S1710), as illustrated in FIG. 5, 15, or 16, when block P and/or block Q is intra-coded, the bS value may be determined by determining whether the target boundary is a boundary of a coding block.

Figure 18:
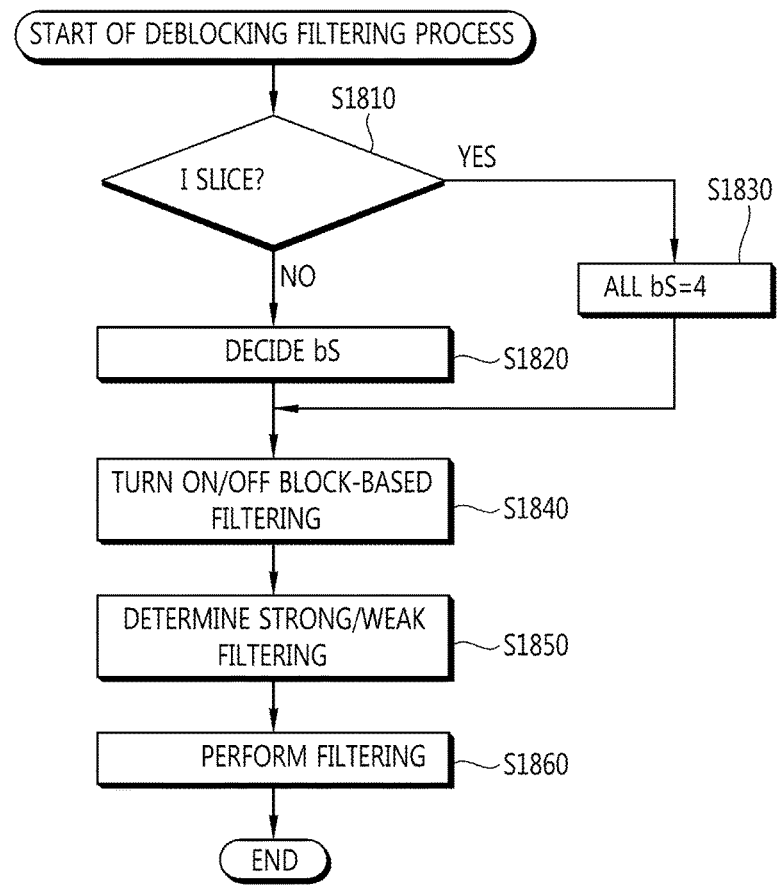

FIG. 18 is a diagram schematically illustrating another example of the method of determining a bS value to apply the deblocking filtering. In FIG. 18, unlike the example illustrated in FIG. 17, when block P and/or block Q is intra-coded (I slice), the bS value is not additionally distinguished and determined.

Referring to FIG. 18, it is determined whether block P and/or block Q is intra-coded (I slice) in order to apply the deblocking filtering (S1810).

When it is not a case that block P and/or block Q is intra-coded (i.e. it is the case that none of block P and Q is intra coded), the general bS decision step as illustrated in FIG. 17 is performed (S1820).

When it is determined that block P and/or block Q is intra-coded (I slice), the bS value is determined to be a single value (for example, 4) unlike the example illustrated in FIG. 17 (S1830).

Subsequently, ON/OFF of block-based filtering is determined on the basis of the determined bS value (S1840), it is determined whether a strong filter or a weak filter should be applied to a predetermined bS value (S1850), and the filtering operation is then performed on the basis thereof (S1860).

In addition to the example illustrated in FIG. 18, the method using a representative bS value described in the example illustrated in FIG. 6 may be modified to perform the deblocking filtering, as another method of modifying a applying the above-mentioned deblocking filtering method.

In the example illustrated in FIG. 6, when the deblocking filtering is performed by 8×8 pixel blocks, the larger bS value of two bS values determined in the unit of 4×4 pixel blocks is used as a representative bS value.

Figure 19:
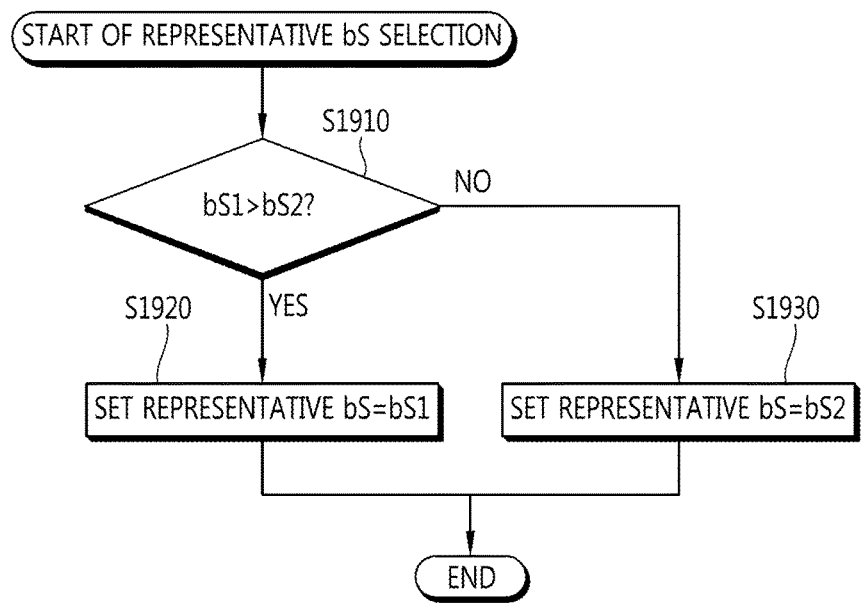
FIG. 19 is a flowchart schematically illustrating an example of a method of determining a representative bS.

FIG. 19 is a flowchart schematically illustrating an example of the method of determining a representative bS value.

Referring to FIG. 19, the magnitudes of bS1 and bS2 in a deblocking filtering unit block are compared to select the representative bS value (S1910).

When it is determined in step S1910 that bS1 is larger than bS2, the representative bS value is determined to be bS1 (S1920). On the other hand, when it is determined in step S1510 that bS2 is larger than bS1, the representative bS value is determined to be bS2 (S1930).

Here, bS1 and bS2 may be bS values of two vertical edges in the deblocking filtering unit block or may be bS values of two horizontal edges. The method illustrated in FIG. 19 may be performed in the deblocking filtering process on the vertical edges to determine the representative bS value of the vertical edges and then may be performed in the deblocking filtering process on the horizontal edges to determine the representative bS value of the horizontal edges.

The filter module may perform the deblocking filtering using the determined representative bS value.

The example illustrated in FIG. 19 illustrates that the larger bS value is used as the representative bS value as in the example illustrated in FIG. 6. Otherwise, the method of determining a representative bS value may be changed to reduce excessive deblocking filtering and to reduce a computational load.

Figure 20:
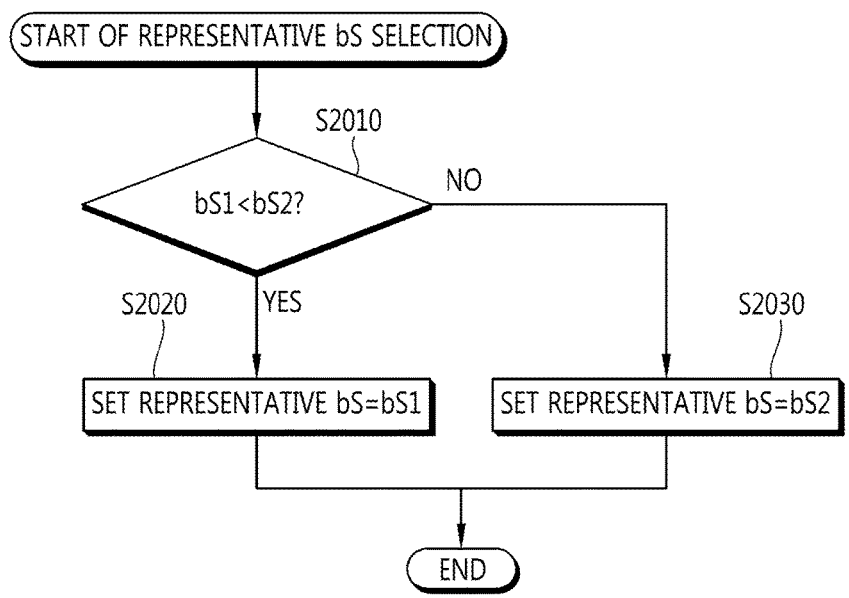
FIG. 20 is a flowchart schematically illustrating another example of the method of determining a representative bS.

FIG. 20 is a flowchart schematically illustrating another example of the method of determining a representative bS value.

Referring to FIG. 20, the magnitudes of bS1 and bS2 in a deblocking filtering unit block are compared to select the representative bS value (S2010).

When it is determined in step S2010 that bS1 is smaller than bS2, the representative bS value is determined to be bS1 (S2020). On the other hand, when it is determined in step S2010 that bS2 is smaller than bS1, the representative bS value is determined to be bS2 (S2030).

Here, bS1 and bS2 may be the bS values of two vertical edges in the deblocking filtering unit block or may be the bS values of two horizontal edges. The method illustrated in FIG. 20 may also be performed in the deblocking filtering process on the vertical edges to determine the representative bS value of the vertical edges and then may be performed in the deblocking filtering process on the horizontal edges to determine the representative bS value of the horizontal edges.

The filter module may perform the deblocking filtering using the determined representative bS value.

On the other hand, when the bS value is derived to any one of five values as described with reference to FIGS. 17 and 18 but the deblocking filtering is actually performed, it may be determined only whether the bS value is greater than 0 or the bS value is greater than 2. Therefore, when there are three different bS values, it is possible to effectively perform the deblocking filtering depending on characteristics of pixels or blocks.

Figure 21:
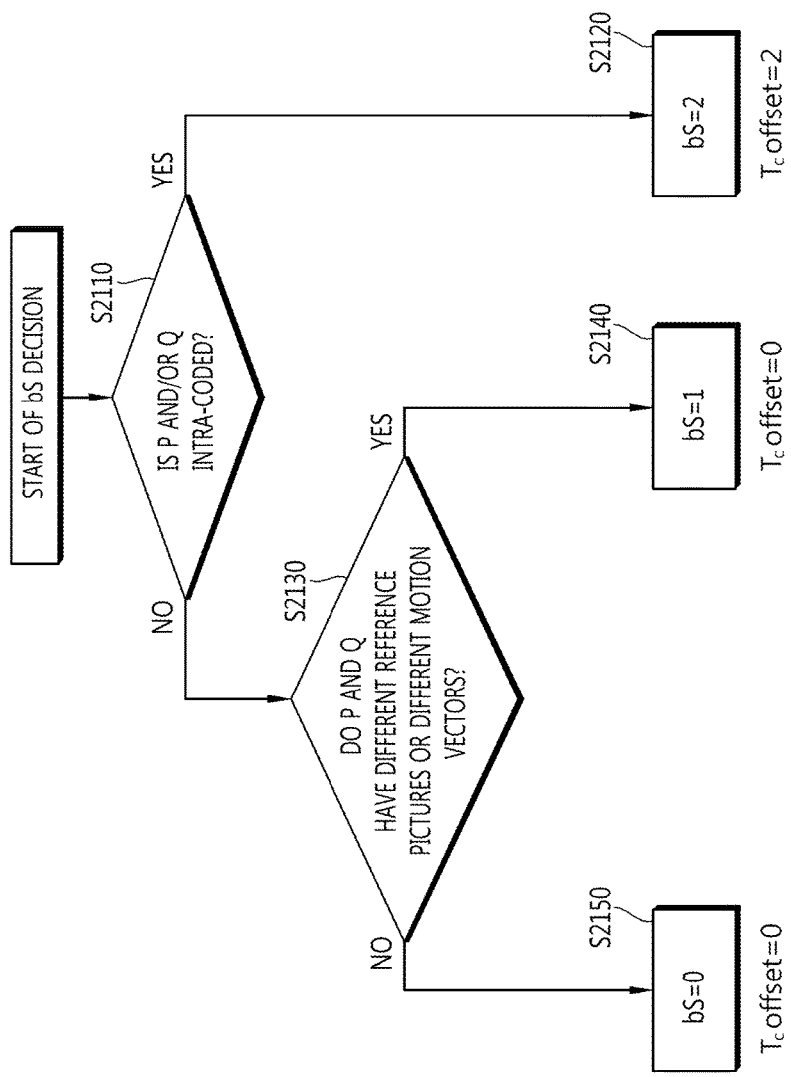
FIG. 21 is a flowchart schematically illustrating a method of simplifying a bS decision tree.

FIG. 21 is a flowchart schematically illustrating another method capable of simplifying the bS decision tree (bS decision method).

Referring to FIG. 21, it is first determined whether block P and/or block Q is intra-coded (S2110).

When it is determined that block P and/or block Q is intra-coded, the bS value of the boundary between block P and block Q is determined to be 2 (S2120).

When it is not the case that block P and/or block Q is intra-coded (i.e. it is a case that none of block P and block Q is intra-coded), it is determined whether block P and block Q include a coefficient (transform coefficient) other than 0, block P and block Q have different reference pictures, or block P and block Q have different motion vectors (S2130).

When it is determined in step S2130 that block P and block Q include a coefficient (transform coefficient) other than 0, block P and block Q have different reference pictures, or block P and block Q have different motion vectors, the bS value of the boundary between block P and block Q is set to 1 (S2140).

Otherwise, that is, when the deblocking filtering is not performed, the bS value is set to 0 (S2140).

In other words, when the bS value is 0, that is, when the deblocking filtering is not performed, block P and block Q are coded in an inter prediction mode and the motion information pieces thereof are similar. At this time, the similarity of the motion information pieces means that block P and block Q have the same reference pictures and a difference between components of the motion vectors is smaller than 4 (for example, the difference between the x components of the motion vectors is smaller than 4 and the difference between y components thereof is smaller than 4).

At this time, when the cbf (coded block flag) of block P and block Q is not 0, that is, when block P and block Q include a transform coefficient other than 0, block P and block Q may be predicted in the inter prediction mode and the bS value may be set to 0 when the motion information pieces thereof are similar to each other. Otherwise, that is, when the motion information pieces thereof are not similar to each other or block P and/or block Q are coded in an intra prediction mode, the bS value may be set to 1 or 2.

However, when a transform coefficient other than 0 is present in block P and block Q includes (when the value of cbf is not 0) and when the motion information pieces of block P and block Q may be similar and thus the bS value is set to 0, it may be necessary to perform the deblocking filtering. When a transform coefficient other than 0 is present but the deblocking filtering is excluded due to the similarity of the motion information pieces, a user's subjective loss and objective data loss may occur.

Therefore, the case in which the bS value is set to 0 may be strictly determined as follows.

For example, as described above, in FIG. 21, a case in which the reference pictures of two blocks P and Q with an edge interposed therebetween are equal to each other and the differences between the motion vector components of block P and block Q are smaller than 4 is determined to be the case where the motion information pieces are similar to each other. Therefore, even when the difference in any component between the motion vector $MV_P$ of block P and the motion vector $MV_Q$ of block Q is equal to or greater than 4, the bS value is not 0. That is, when the difference between the x component $MV_{P0}$ of the motion vector $MV_P$ and the x component $MV_{Q0}$ of the motion vector $MV_Q$ is equal to or greater than 4 or the difference between the y component $MV_{P1}$ of the motion vector $MV_P$ and the y component $MV_{Q1}$ of the motion vector $MV_Q$ is equal to or greater than 4, the bS is set to a value other than 0, for example, 1.

Therefore, without depending on whether the difference in component between the motion vectors is less than 4, equal to 4, or greater than 4, a threshold value may be set and then the difference in component between the motion vectors may be compared with the threshold value. For example, when the difference between the x component $MV_{P0}$ of the motion vector $MV_P$ and the x component $MV_{Q0}$ of the motion vector $MV_Q$ is equal to or greater than a threshold value $Th_0$ or the difference between the y component $MV_{P1}$ of the motion vector $MV_P$ and the y component $MV_{Q1}$ of the motion vector $MV_Q$ is equal to or greater than a threshold value $Th_1$, the bS may be set to 1 (2 when block P and/or block Q is coded in an intra prediction mode). At this time, $Th_0$ and $Th_1$ may be equal to each other. For example, when the threshold value is small, the number of cases in which the bS value is set to 0 is reduced. Accordingly, by setting the threshold values $Th_0$ and $Th_1$ to a value (2 or 3) smaller than 4, it is possible to reduce the number of cases in which the bS value is set to 0.

Expression 7 expresses an example of a method of determining whether the bS value is set to 0 or 1 on the basis of the above-mentioned method.

(1) $pcMV_{P0}$-=$pcMV_{Q0}$;$pcMV_{P0}$-=$pcMV_{Q0}$;

$uiBs$=($pcMVP0$.getAbsHor( )=$th$)|
  ($pcMVP0$.getAbsVer( )=$th$)|

($pcMVP1$.getAbsHor( )=$th$)|($pcMVP1$.getAbsVer( )=$th$);  <Expression 7>

In Expression 7, (1) expresses calculating the difference in x component and the difference in y component between the motion vector of block P and the motion vector of block Q, and (2) expresses determining whether the differences in components are greater than the threshold value.

On the other hand, $t_{c\_}$ offset may be removed to reduce the complexity of the deblocking filtering.

As described above in the deblocking filtering method for chroma components, when the average value of the quantization parameters for block P and block Q in consideration of the round value is $qP_L$, (1) $t_c$ may be determined to be a value corresponding to the quantization parameter Q=Clip (0, 55, $qP_L$) when the bS value is greater than a predetermined value (for example, 2 or 1). (2) $t_c$ may be determined to be a value corresponding to the quantization parameter Q=$qP_L$ when the bS value is equal to or less than the predetermined value (for example, 2 or 1).

At this time, the relationship between the quantization parameter Q and $t_c$ may be specified using a table.

Table 3 shows an example of the relationship among the deblocking parameters Q, $t_c$, and β.

abs($p_3$-$p_0$)+abs($q_0$-$q_3$) is smaller than (β>>3) in additional consideration of samples, for example, $p_3$ and $q_3$, other than $p_0$, $p_1$ and $p_2$ and $q_0$, $q_1$, and $q_2$. (3) It may also be determined whether abs($p_0$-$q_0$) in two samples $p_0$ and $q_0$ on the right and left sides of the boundary is smaller than (5*$t_C$+1)>>1. As described above, plural columns or rows in a block may be used to perform the determination. For example, plural rows may be selected for the vertical edge and the determinations of (1) to (3) may be performed for each row. Plural columns may be selected for the horizontal edge and the determinations of (1) to (3) may be performed for each column.

In case of the vertical edge, when it is determined in (1) to (3) that the values of the plural rows are smaller than the references, strong filtering may be performed on the corresponding edge. In case of the horizontal edge, when it is determined in (1) to (3) that the values of the plural columns are smaller than the references, strong filtering may be performed on the corresponding edge.

The quantization parameter $qP_L$ may be defined as $qP_L$= (($QP_Q$+$QP_P$+1)>>1) using the quantization parameter $QP_P$ for the luma samples of block P and quantization parameter $QP_Q$ for the luma samples of block Q.

When the bS is derived to any one of five values and the bS value is greater than 2, the quantization parameter Q may be set to Q=Clip3(0, 55, $qP_L$+2) and the value of $t_c$ corresponding to the value of the quantization parameter Q and the value of β may be acquired from Table 3. At this time, when the bS value is equal to or less than 2, the quantization parameter Q may be set to Q=$qP_L$ and the value of $t_c$ corresponding to the value of the quantization parameter Q and the value of β may be acquired from Table 3.

On the contrary, when the bS is derived to any one of three values (examples illustrated in FIGS. 12 to 14), the value of the quantization parameter Q may be determined to be one value regardless of the bS value and then the value of $t_c$ corresponding to the determined value of the quantization parameter Q and the value of β may be acquired from Table 3. For example, when the bS value is derived to any one of three values 0, 1, and 2, the quantization parameter Q may

TABLE 3

| Q | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|----|----|----|----|----|----|----|----|----|
| β | 0 | 0 | 0 | 0 | 0 | 0 | 0 | 0 | 0 | 0 | 0 | 0 | 0 | 0 | 0 | 0 | 6 | 7 | 8 |
| $t_C$ | 0 | 0 | 0 | 0 | 0 | 0 | 0 | 0 | 0 | 0 | 0 | 0 | 0 | 0 | 0 | 0 | 0 | 0 | 1 |

| Q | 19 | 20 | 21 | 22 | 23 | 24 | 25 | 26 | 27 | 28 | 29 | 30 | 31 | 32 | 33 | 34 | 35 | 36 | 37 |
|---|----|----|----|----|----|----|----|----|----|----|----|----|----|----|----|----|----|----|----|
| β | 9 | 10 | 11 | 12 | 13 | 14 | 15 | 16 | 17 | 18 | 20 | 22 | 24 | 26 | 28 | 30 | 32 | 34 | 36 |
| $t_C$ | 1 | 1 | 1 | 1 | 1 | 1 | 1 | 1 | 2 | 2 | 2 | 2 | 3 | 3 | 3 | 3 | 4 | 4 | 4 |

| Q | 38 | 39 | 40 | 41 | 42 | 43 | 44 | 45 | 46 | 47 | 48 | 49 | 50 | 51 | 52 | 53 | 54 | 55 |
|---|----|----|----|----|----|----|----|----|----|----|----|----|----|----|----|----|----|----|
| β | 38 | 40 | 42 | 44 | 46 | 48 | 50 | 52 | 54 | 56 | 58 | 60 | 62 | 64 | 64 | 64 | 64 | 64 |
| $t_C$ | 5 | 5 | 6 | 6 | 7 | 8 | 9 | 9 | 10 | 10 | 11 | 11 | 12 | 12 | 13 | 13 | 14 | 14 |

Table 3 show β and $t_c$ for the purpose of convenience of explanation, but the present invention is not limited to this table. For example, Table 3 may show β' and $t_C$ as in Tables 1 and 2. In this case, $t_C$ and β may be derived from $t_C$ and β' using $t_C$=$t_C$'*(1<<(BitDepthY−8)) and β=β'*(1<<(BitDepthY−8)).

As described above, $t_C$ and β may serve as a reference for determining whether strong filtering will be performed. For example, when it is assumed that three samples of block P closest to an edge are sequentially defined as $p_0$, $p_1$, and $p_2$ and three samples of block Q closest from the edge are sequentially defined as $q_0$, $q_1$, and $q_2$, (1) it may be determined whether dpq is smaller than (β>>2) with abs($p_2$−2$p_1$+$p_0$)+abs($q_2$−2$q_1$+$q_0$)=dpq. (2) It may be determined whether be determined to be Q=Clip3(0, 55, $qP_L$+2*bS−2) and the value of $t_c$ corresponding to the determined value of the quantization parameter Q and the value of β may be acquired from Table 3.

On the other hand, when the value of the quantization parameter Q is determined, the more accurate value of tc may be acquired in consideration of the value of $t_{c\_}$ offset in addition to the bS values and the quantization parameter values and the bS values of block P and block Q. For example, the video decoder may determine the value of the quantization parameter Q in consideration of the information of $t_{c\_}$ offset transmitted through the slice header.

The information of $t_{c\_}$ offset transmitted through the slice header is a value transmitted to apply the optimized deblocking filter to each slice and may be expressed by slice_tc_offset_div2 as the information of $t_C$ offset on the slice including q samples adjacent to an edge. The slice_tc_offset_div2 specifies the offset value of the default deblocking parameter for $t_C$.

In this case, the quantization parameter Q may be set to Q=Clip3(0, 55, qP$_L$+2*bS−2+slice_tc_offset_div2<<1) and the parameter $t_C$ may be determined on the basis of the set value of quantization parameter Q and the value of β. For example, $t_C$ may be determined on the basis of the value of the quantization parameter Q and the value of β using a table in which the relationship among Q, β, and $t_C$ is defined, such as Table 3.

Therefore, the value of Q may be determined as described above on the basis of the information of $t_C$ offset (slice_tc_offset_div2) transmitted through the slice header and the value of $t_c$ may be determined on the basis of the values of β and Q transmitted from the video encoder. The value of $t_C$ is a value for quantizing a blocking artifact corresponding to the degree of quantization as described above and may be used as a reference for determining a range (clipping range) of a filtered pixel value at the time of performing the deblocking filtering, or may be used as a reference for determining which of strong filtering and weak filtering will be performed.

Figure 22:
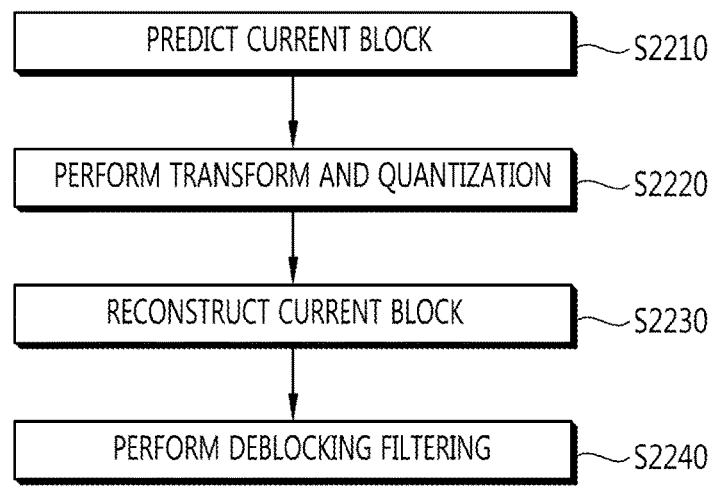
FIG. 22 is a flowchart schematically illustrating a video encoding method according to the invention.

FIG. 22 is a flowchart schematically illustrating a video encoding method according to the invention.

Referring to FIG. 22, a video encoder divides an input video and perform a prediction operation on a current block (S2210). The prediction operation on the current block may be performed by a prediction module of the video encoder. The prediction module may perform an intra prediction or an inter prediction on the current block. In consideration of RDO (Rate Distortion Optimization) or the like, it may be determined which of the intra prediction and the inter prediction should be performed.

When a skip mode is not applied, the prediction module generates a prediction signal and generates a residual signal which is a difference between an original signal and the prediction signal.

The video encoder transforms and quantizes the residual signal (S2220). The transform of the residual signal may be performed by a transform module and the quantization of the transformed signal (for example, transform coefficients) may be performed by a quantization module.

The transformed and quantized signal may be transmitted after undergoing an entropy encoding process.

The video encoder dequantizes and inversely transforms the transformed and quantized signal to reconstruct the current block (S2230). The inversely-quantized and inversely-transformed signal is added to the residual signal to reconstruct the original signal.

The video encoder may apply the deblocking filtering on the reconstructed signal (S2240). The reconstructed signal may be reconstructed to a signal closer to the original signal by the deblocking filtering. The deblocking filtering may be performed by the filter module. The filter module may apply the SAO (Sample Adaptive Offset) after applying the deblocking filter.

The specific details of the deblocking filtering are the same as described above with reference to the accompanying drawings.

The signal to which the deblocking filtering has been applied may be stored in a method such as a DPB (Decoded Picture Buffer) and may be referred to for predicting other blocks or other pictures.

It has been described herein that a residual signal is generated by prediction and is transmitted, but the residual signal is not generated/transmitted when the skip mode is applied.

Figure 23:
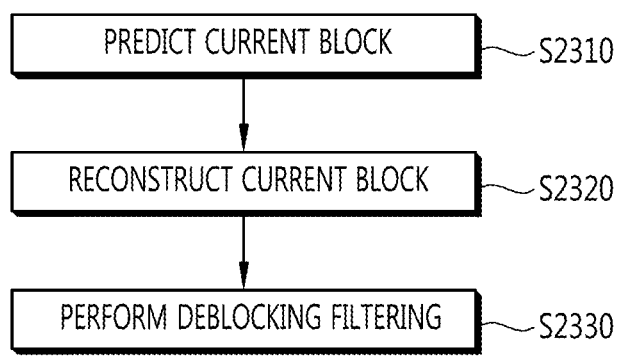
FIG. 23 is a flowchart schematically illustrating a video decoding method according to the invention.

FIG. 23 is a flowchart schematically illustrating a video decoding method according to the invention.

Referring to FIG. 23, a video decoder performs an entropy decoding operation on a received bitstream and performs a prediction operation on a current block (S2310). The prediction process on the current block may be performed by a prediction module of the video decoder. The prediction module may perform an inter prediction or an intra prediction on the current block on the basis of information signaled from the video encoder. The prediction module generates a prediction signal (prediction block) of the current block through the prediction.

The video decoder reconstructs the current block on the basis of the prediction of the current block (S2320). The video decoder may generate a residual signal (residual block) from the bitstream received from the encoder through the use of dequantization/inverse transform and may add the prediction signal (prediction block) and the residual signal (prediction block) to reconstruct a reconstructed signal (reconstructed block). When the skip mode is applied, the residual signal may not be transmitted and the prediction signal may be used as the reconstructed signal.

The video decoder performs the deblocking filtering on the reconstructed signal (reconstructed block) (S2330). The deblocking filtering may be performed by a filter module of the decoder. The filter module applies the deblocking filter of the reconstructed block to modify the reconstructed block to be closer to the original block.

The specific details of the deblocking filtering are the same as described above with reference to the accompanying drawings.

The filter module may apply the SAO (Sample Adaptive Offset) to the reconstructed block on the basis of information received from the video encoder after applying the deblocking filter.

The signal reconstructed by the filter module may be stored in a method such as a DPB (Decoded Picture Buffer) and may be referred to for predicting other blocks or other pictures or may be output as a reconstructed picture.

It should be noted that FIGS. 22 and 23 are provided to schematically illustrate the application of the deblocking filtering according to the invention to the encoding/decoding processes, for the purpose of easy understanding of the invention, and the encoding/decoding processes described in detail with reference to the accompanying drawings may be performed together therewith.

Figure 24:
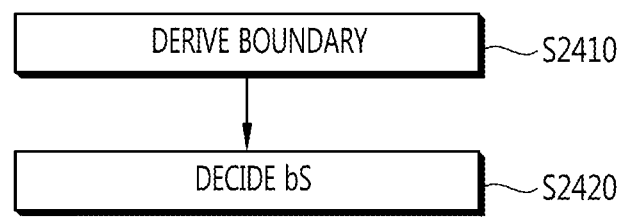
FIG. 24 is a flowchart illustrating an example of a bS deriving method according to the invention.

FIG. 24 is a flowchart schematically illustrating an example of a bS deriving method according to the invention.

Referring to FIG. 24, a boundary of which the bS will be determined is derived (S2410). The boundary of which the bS will be determined may be a boundary of a deblocking filtering unit block. Alternatively, the boundary of which the bS will be determined may be a boundary of a bS setting unit block. Alternatively, the boundary of which the bS will be determined may be the overlapped boundary of the boundary of the deblocking filtering unit block and the boundary of the bS setting unit block.

When the boundary of which the bS will be determined is derived, the bS is set for each bS setting unit block (S2420). When the boundary of which the bS will be determined is the boundary of the deblocking filtering unit block, the bS may be set for each edge corresponding to the boundary of which the bS will be determined and the boundary of the bS setting unit block. When the boundary of which the bS will be determined is the boundary of the bS setting unit block, the bS may be set for the edge corresponding to the boundary of which the bS will be determined and the boundary of the deblocking filtering unit block. When the boundary of which the bS will be determined is the overlapped boundary of the boundary of the deblocking filtering unit block and the boundary of the bS setting unit block, the bS may be set for the boundary of which the bS will be determined.

In the bS setting method, as described above, the bS of the corresponding boundary may be derived to any one of five bS values or the bS of the corresponding boundary may be derived to any one of three bS values. Another method of deriving a bS by reducing complexity may be employed. The specific method of deriving/determining a bS is the same as described above.

For the purpose of convenience of explanation, FIG. 24 illustrates the example where the bS of an edge which is a boundary of a bS setting unit block and a boundary of a deblocking filtering unit block is determined, but the invention is not limited to this example. A bS may be determined using the above-mentioned representative value determining method or the like.

While the methods in the above-mentioned exemplary system have been described on the basis of flowcharts including a series of steps or blocks, the invention is not limited to the order of steps and a certain step may be performed in a step or an order other than described above or at the same time as described above. The above-mentioned embodiments may include various examples. Therefore, the invention includes all substitutions, corrections, and modifications belonging to the appended claims.

When it is mentioned above that an element is "connected to" or "coupled to" another element, it should be understood that still another element may be interposed therebetween, as well as that the element may be connected or coupled directly to another element. On the contrary, when it is mentioned that an element is "connected directly to" or "coupled directly to" another element, it should be understood that still another element is not interposed therebetween.

The invention claimed is:

1. A deblocking filtering method, by a decoding apparatus, the method comprising:
    deriving a boundary of a deblocking filtering unit block which is a unit block for which deblocking filtering is performed in a reconstructed current picture;
    setting a boundary strength (bS) of a boundary of a bS setting unit block in the reconstructed current picture; and
    applying deblocking filtering on the boundary of the deblocking filtering unit block based on the bS,
    wherein the step of setting the bS includes setting a bS value for a target boundary which is an overlapped boundary of the bS setting unit block and the deblocking filtering unit block,
    wherein the step of applying the deblocking filtering includes determining whether the deblocking filtering is applied to a luma sample on the basis of the bS value and whether the deblocking filtering is applied to a chroma sample on the basis of the bS value,
    wherein the bS value is set as a value among 0, 1 and 2,
    wherein it is determined that the deblocking filtering is applied to the luma sample when the bS value is greater than a first threshold value which is 0, and it is determined that the deblocking filtering is applied to the chroma sample when the bS value is greater than a second threshold value which is 1,
    wherein when the bS value is equal to 1, the deblocking filtering is applied to the luma sample and the deblocking filtering is not applied to the chroma sample.

2. The method of claim 1, wherein the step of setting the bS includes:
    setting the bS value of a target boundary which is a overlapped boundary of a vertical boundary of the bS setting unit block and a vertical boundary of the deblocking filtering unit block when the derived boundary of the deblocking filtering unit block is the vertical boundary; and
    setting the bs value of a target boundary which is a overlapped boundary of a horizontal boundary of the bS setting unit block and a horizontal boundary of the deblocking filtering unit block when the derived boundary of the deblocking filtering unit block is the horizontal boundary.

3. The method of claim 1, wherein the step of setting the bS includes:
    setting the bS value of the target boundary to 2 in a first case in which at least one of two blocks with the target boundary as a boundary between the two blocks is intra-coded;
    setting the bS value of the target boundary to 1 in a second case which is a case other than the first case and is not a case in which the deblocking filtering is not applied to the target boundary; and
    setting the bS value of the target boundary to 0 in a case other than the first case and the second case, and
    wherein the deblocking filtering is applicable to the target boundary when the bS of the target boundary is 2 or 1.

4. The method of claim 3, wherein the second case in which the bS value is set to 1 is a case in which two blocks with the target boundary as a boundary between the two blocks are not intra-coded and includes:
    a case in which at least one of the two blocks with the target boundary as a boundary between the two blocks includes a transform coefficient other than 0; and
    a case in which the two blocks with the target boundary as a boundary between the two blocks have different reference pictures or different motion vectors.

5. The method of claim 1, wherein the step of deriving the boundary of the deblocking filtering unit block and the step of setting the bS are first performed on vertical edges in the reconstructed current picture including the deblocking filtering unit block and are then performed on horizontal edges in the reconstructed current picture including the deblocking filtering unit blocks.

6. The method of claim 1, wherein when the bS value set for the target boundary is larger than 0 and the deblocking filtering is performed thereon, it is determined which of strong filtering and weak filtering is applied.

7. The method of claim 6, wherein the determination on which of strong filtering and weak filtering is applied is performed on the basis of samples of the two blocks with the target boundary as a boundary between the two block, and
    wherein the determination on which of strong filtering and weak filtering is performed on the basis of samples to be subjected to the deblocking filtering out of samples in sample rows with the target boundary as a boundary between the sample rows when the target boundary is a vertical boundary, and
    on the basis of samples to be subjected to the deblocking filtering out of samples in sample columns with the target boundary as a boundary between the sample columns when the target boundary is a horizontal boundary.

8. The method of claim 6, wherein when it is determined that the weak filtering is performed, the filtering is performed on the samples selected from the samples to be subjected to the deblocking filtering including the strong filtering and the weak filtering.

9. The method of claim 1, wherein the deblocking filtering unit block is an 8×8 pixel block.

10. The method of claim 1, wherein the bS setting unit block is a 4×4 pixel block.

11. The method of claim 1, wherein a reference bS value used to determine whether the deblocking filtering is applied to a luma sample is different from a reference bS value used to determine whether the deblocking filtering is applied to a chroma sample.

12. The method of claim 11, wherein the step of setting the bS includes:
    setting the bS value to 2 when at least one of two luma sample blocks with the target boundary as a boundary between the two luma sample blocks is intra-coded;
    setting the bS value to 1 when it is not a case in which at least one of two luma sample blocks with the target boundary as a boundary between the two luma sample blocks is intra-coded and the deblocking filtering is applicable to the luma sample; and
    setting the bS value to 0 when the target boundary is not a deblocking filtering target for the luma sample.

13. The method of claim 12, wherein the case in which the bS value is set to 1 is not a case in which at least one of two luma sample blocks with the target boundary as a boundary between the two luma sample block is intra-coded and includes:
    a case in which at least one of two luma sample blocks with the target boundary as a boundary between the two luma sample blocks includes a transform coefficient other than 0;
    a case in which the two luma sample blocks with the target boundary as a boundary between the two luma sample blocks have different reference pictures or different motion vectors.

14. The method of claim 1, wherein the deblocking filtering is applied to the luma sample or the chroma sample by using a deblocking parameter tC, the tC is derived by using a luma quantization parameter Q and a predetermined mapping table using a value of the Q,
    wherein the Q is derived based on the following equation, $qPL+2*bS-2+slice\_tc\_offset\_div2<<1$, wherein the qPL is a quantization parameter for the deblocking filtering, the slice_tc_offset_div2 represents an offset value for the deblocking filtering, and the slice_tc_offset_div2 is obtained through a slice header.

15. The method of claim 14, wherein the qPL is determined based on the following equation, $(QPQ+QPP+1)>>1$, wherein QPQ is a quantization parameter of a first block among two blocks with the target boundary as a boundary between the two blocks and QPP is a quantization parameter of a second block among the two blocks.

16. A deblocking filtering method, by an encoding apparatus, the method comprising:
    deriving a boundary of a deblocking filtering unit block which is a unit block for which deblocking filtering is performed in a reconstructed current picture;
    setting a boundary strength (bS) of a boundary of a bS setting unit block in the reconstructed current picture; and
    applying deblocking filtering on the boundary of the deblocking filtering unit block based on the bS,
    wherein the step of setting the bS includes setting a bS value for a target boundary which is an overlapped boundary of the bS setting unit block and the deblocking filtering unit block,
    wherein the step of applying the deblocking filtering includes determining whether the deblocking filtering is applied to a luma sample on the basis of the bS value and whether the deblocking filtering is applied to a chroma sample on the basis of the bS value,
    wherein the bS value is set as a value among 0, 1 and 2,
    wherein it is determined that the deblocking filtering is applied to the luma sample when the bS value is greater than a first threshold value which is 0, and it is determined that the deblocking filtering is applied to the chroma sample when the bS value is greater than a second threshold value which is 1,
    wherein when the bS value is equal to 1, the deblocking filtering is applied to the luma sample and the deblocking filtering is not applied to the chroma sample.

17. A non-transitory computer-readable storage medium storing information on instructions causing a decoding apparatus to perform the following steps:
    deriving a boundary of a deblocking filtering unit block which is a unit block for which deblocking filtering is performed in a reconstructed current picture;
    setting a boundary strength (bS) of a boundary of a bS setting unit block in the reconstructed current picture; and
    applying deblocking filtering on the boundary of the deblocking filtering unit block based on the bS,
    wherein the step of setting the bS includes setting a bS value for a target boundary which is an overlapped boundary of the bS setting unit block and the deblocking filtering unit block,
    wherein the step of applying the deblocking filtering includes determining whether the deblocking filtering is applied to a luma sample on the basis of the bS value and whether the deblocking filtering is applied to a chroma sample on the basis of the bS value,
    wherein the bS value is set as a value among 0, 1 and 2,
    wherein it is determined that the deblocking filtering is applied to the luma sample when the bS value is greater than a first threshold value which is 0, and it is determined that the deblocking filtering is applied to the chroma sample when the bS value is greater than a second threshold value which is 1,
    wherein when the bS value is equal to 1, the deblocking filtering is applied to the luma sample and the deblocking filtering is not applied to the chroma sample.

* * * * *